(12) United States Patent
Hu et al.

(10) Patent No.: US 12,025,774 B2
(45) Date of Patent: Jul. 2, 2024

(54) OPTICAL IMAGING LENS ASSEMBLY INCLUDING EIGHT LENSES OF +−++−−+−, +−++−++−, +−−+−−+−, +−++−+−−, +−++−−−− or ++++−−+− REFRACTIVE POWERS

(71) Applicant: ZHEJIANG SUNNY OPTICAL CO., LTD, Ningbo (CN)

(72) Inventors: Yabin Hu, Ningbo (CN); Liefeng Zhao, Ningbo (CN); Fujian Dai, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 671 days.

(21) Appl. No.: 17/036,963

(22) Filed: Sep. 29, 2020

(65) Prior Publication Data

US 2021/0271053 A1    Sep. 2, 2021

(30) Foreign Application Priority Data

Feb. 27, 2020 (CN) .......................... 202010123949.6

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2017/0045714 | A1 | 2/2017 | Huang |
| 2018/0239117 | A1 | 8/2018 | Lee et al. |
| 2021/0191081 | A1* | 6/2021 | Dong ........................ G02B 9/64 |
| 2021/0263285 | A1* | 8/2021 | Wang .................. G02B 27/0025 |
| 2021/0396955 | A1* | 12/2021 | Okano ............... G02B 13/0045 |
| 2022/0155562 | A1* | 5/2022 | Zhang ........................ G02B 9/64 |
| 2023/0176338 | A1* | 6/2023 | Hsieh ........................ G02B 9/64 |
| | | | 359/708 |

OTHER PUBLICATIONS

First Examination Report in Corresponding Indian Application No. 202014053863, mailed Feb. 16, 2022; 6 pgs.

* cited by examiner

*Primary Examiner* — Wen Huang
(74) *Attorney, Agent, or Firm* — HAUPTMAN HAM, LLP

(57) ABSTRACT

The present disclosure discloses an optical imaging lens assembly including, sequentially from an object side to an image side along an optical axis, a first lens, a second lens, a third lens, a fourth lens, a fifth lens, a sixth lens, a seventh lens, and an eighth lens having refractive power. A center thickness CT6 of the sixth lens along the optical axis and a spaced interval T56 between the fifth lens and the sixth lens along the optical axis satisfy: $1.5<CT6/T56<2.6$. A relative F number Fno of the optical imaging lens assembly satisfies: $Fno \leq 1.7$.

18 Claims, 15 Drawing Sheets

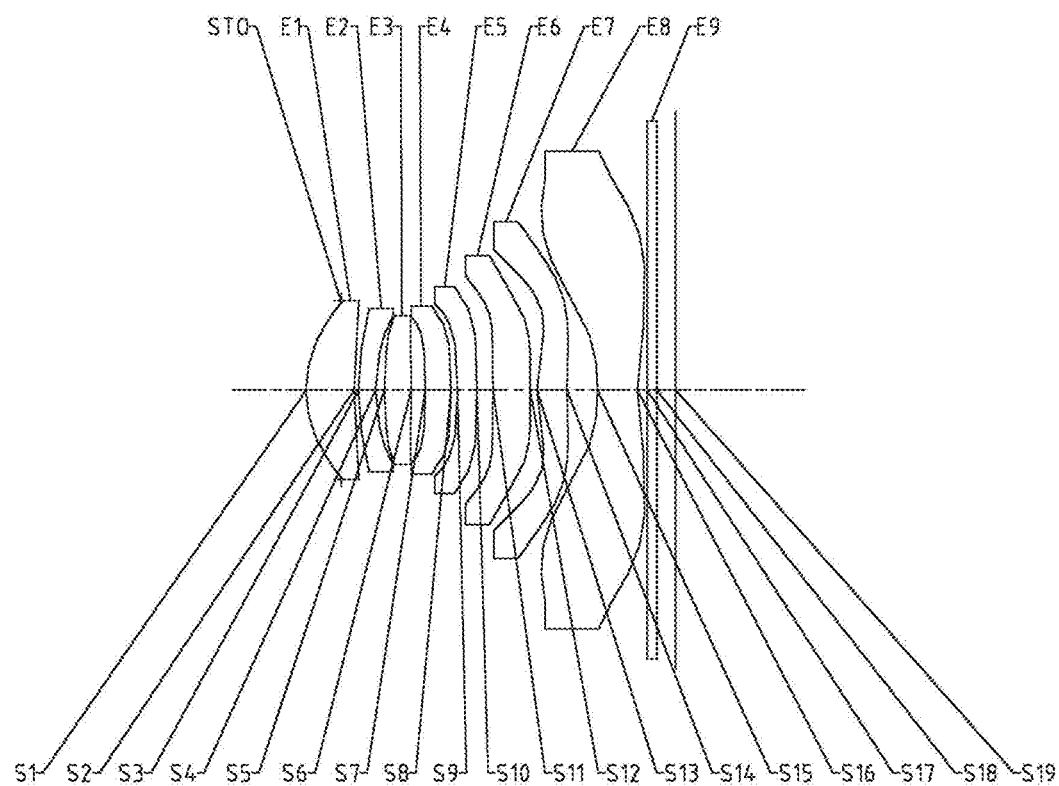
Fig. 5
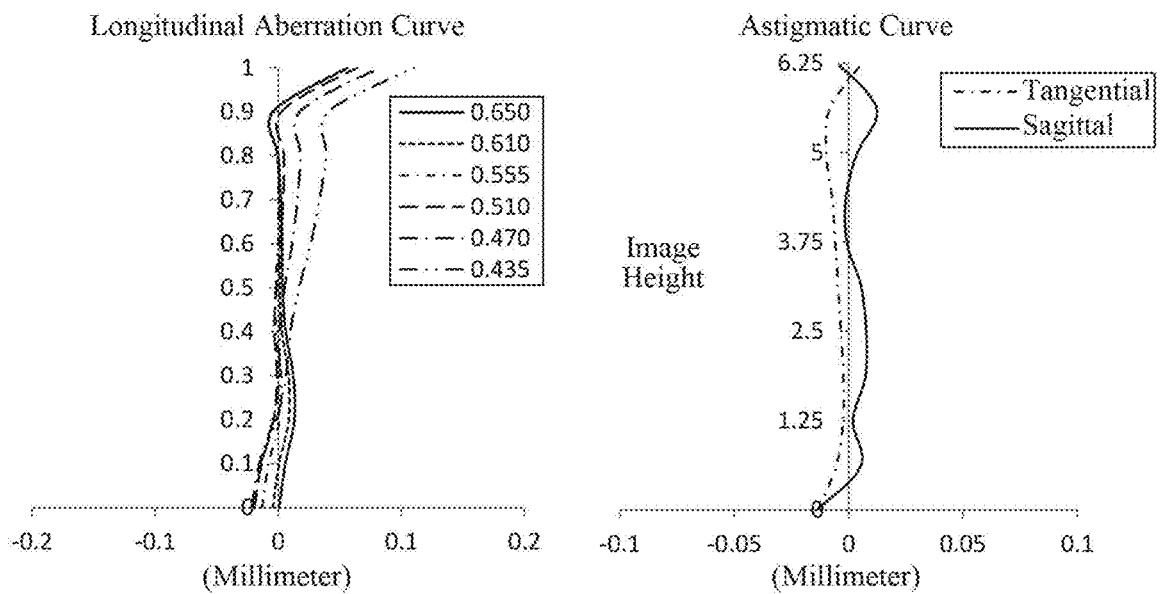
Fig. 6A
Fig. 6B

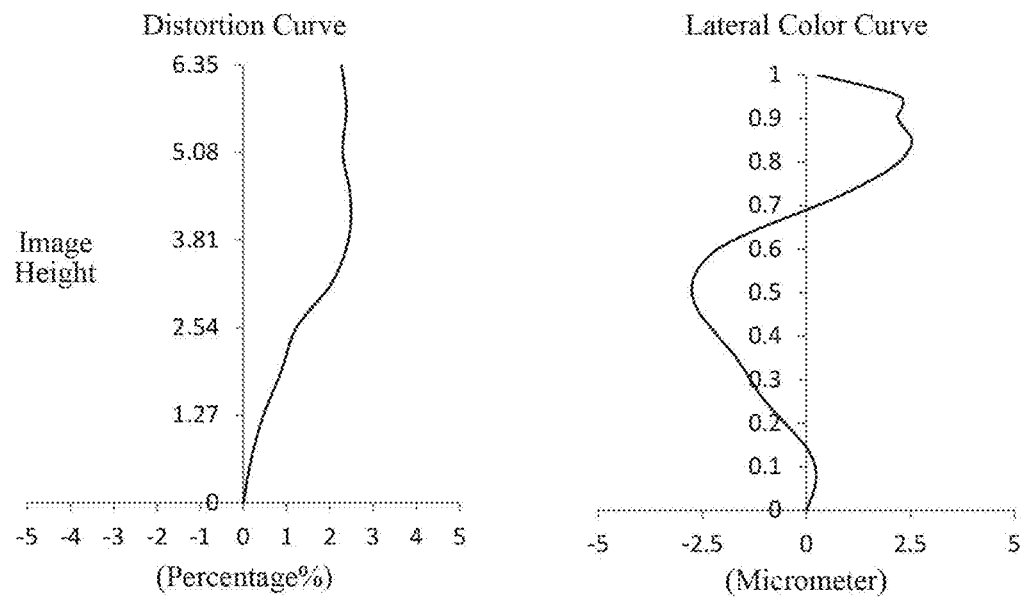
Fig. 10C
Fig. 10D
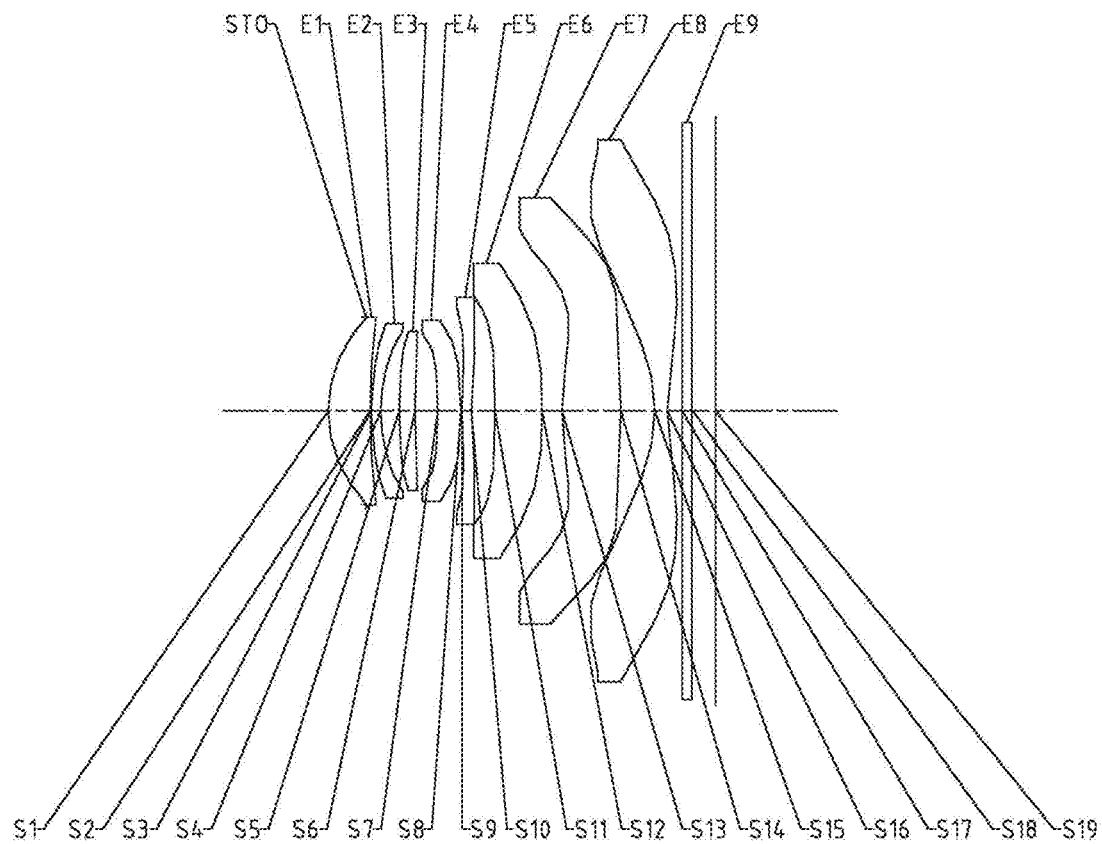
Fig. 11

US 12,025,774 B2

OPTICAL IMAGING LENS ASSEMBLY INCLUDING EIGHT LENSES OF +−++−−+−, +−++−++−, +−−+−−+−, +−++−+−−, +−++−−−− or ++++−−+− REFRACTIVE POWERS

CROSS-REFERENCE TO RELATED APPLICATION

This application claims benefit of priority to Chinese Patent Application No. 202010123949.6 filed on Feb. 27, 2020 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

With the rapid development of portable electronic products, such as smart phones, manufacturers of the portable electronic products have higher and higher requirements for the camera technology of the portable electronic products. That is, more and more new requirements are put forward for the lens assembly applicable to the portable electronic products. This poses new challenges for optical system design.

Compared with the previous lens assembly applicable to the portable electronic products, such as smart phones, the changes in the parameters of the optical system determine the imaging capabilities and competitive advantages of the optical imaging lens assembly. How to improve the imaging capability and competitive advantage of the optical imaging lens assembly by designing the optical system structure is a subject that requires many designers in the field of optical system design to continue in-depth research and development.

SUMMARY

In one aspect, the present disclosure provides an optical imaging lens assembly which includes, sequentially from an object side to an image side along an optical axis, a first lens, a second lens, a third lens, a fourth lens, a fifth lens, a sixth lens, a seventh lens, and an eighth lens having refractive power. A center thickness CT6 of the sixth lens along the optical axis and a spaced interval T56 between the fifth lens and the sixth lens along the optical axis may satisfy: $1.5<CT6/T56<2.6$. A relative F number Fno of the optical imaging lens assembly may satisfy: $Fno \leq 1.7$.

In one embodiment, at least one of an object-side surface of the first lens to an image-side surface of the eighth lens may be aspheric.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy: $1.0<TTL/ImgH<1.5$.

In one embodiment, an effective focal length f1 of the first lens and a radius of curvature R1 of an object-side surface of the first lens may satisfy: $2.0<f1/R1<3.6$.

In one embodiment, an effective focal length f5 of the fifth lens and a radius of curvature R9 of an object-side surface of the fifth lens may satisfy: $1.0<f5/R9<2.0$.

In one embodiment, a radius of curvature R2 of an image-side surface of the first lens and a radius of curvature R5 of an object-side surface of the third lens may satisfy: $0.5<R2/R5<2.5$.

In one embodiment, a radius of curvature R3 of an object-side surface of the second lens and a radius of curvature R4 of an image-side surface of the second lens may satisfy: $1.0<R3/R4<2.0$.

In one embodiment, a center thickness CT7 of the seventh lens along the optical axis and a spaced interval T78 between the seventh lens and the eighth lens along the optical axis may satisfy: $0.5<CT7/T78<2.5$.

In one embodiment, a center thickness CT1 of the first lens along the optical axis and a center thickness CT3 of the third lens along the optical axis may satisfy: $1.5<CT1/CT3<4.0$.

In one embodiment, a refractive index of the second lens and a refractive index of the fifth lens may both be greater than 1.65.

In one embodiment, a center thickness CT4 of the fourth lens along the optical axis and a spaced interval T34 between the third lens and the fourth lens along the optical axis may satisfy: $1.0<CT4/T34<2.0$.

In one embodiment, a center thickness CT5 of the fifth lens along the optical axis, a center thickness CT8 of the eighth lens along the optical axis and a spaced interval T67 between the sixth lens and the seventh lens along the optical axis may satisfy: $1.5<(CT8+T67)/CT5<4.0$.

In one embodiment, a spaced interval T34 between the third lens and the fourth lens along the optical axis, a spaced interval T45 between the fourth lens and the fifth lens along the optical axis and a spaced interval T67 between the sixth lens and the seventh lens along the optical axis may satisfy: $0.8<T34/(T45+T67)<3.0$.

In one embodiment, the fourth lens may have positive refractive power, an object-side surface thereof may be a concave surface, and an image-side surface thereof may be a convex surface.

In one embodiment, an object-side surface of the fifth lens may be a concave surface, and an image-side surface thereof may be a concave surface.

In one embodiment, a radius of curvature R3 of an object-side surface of the second lens and a radius of curvature R15 of an object-side surface of the eighth lens may satisfy: $-4.5<R15/R3<-1.0$.

In one embodiment, a spaced interval T67 between the sixth lens and the seventh lens along the optical axis and a spaced interval T78 between the seventh lens and the eighth lens along the optical axis may satisfy: $1.5<T78/T67<7.0$.

In another aspect, the present disclosure provides an optical imaging lens assembly which includes, sequentially from an object side to an image side along an optical axis, a first lens, a second lens, a third lens, a fourth lens, a fifth lens, a sixth lens, a seventh lens, and an eighth lens having refractive power. A spaced interval T34 between the third lens and the fourth lens along the optical axis, a spaced interval T45 between the fourth lens and the fifth lens along the optical axis and a spaced interval T67 between the sixth lens and the seventh lens along the optical axis may satisfy: $0.8 \leq T34/(T45+T67)<3.0$. A relative F number Fno of the optical imaging lens assembly may satisfy: $Fno \leq 1.7$.

Through the above configuration, the optical imaging lens assembly according to the present disclosure may have at least one beneficial effect, such as a relatively small total length and good image quality.

BRIEF DESCRIPTION OF THE DRAWINGS

Other features, objects, and advantages of the present disclosure will become more apparent by reading the detailed description of the non-limiting examples with reference to the accompanying drawings:

FIG. 5 illustrates a schematic structural view of an optical imaging lens assembly according to example 3 of the present disclosure;

FIGS. 6A to 6D illustrate a longitudinal aberration curve, an astigmatic curve, a distortion curve, and a lateral color curve of the optical imaging lens assembly of the example 3, respectively;

FIGS. 10A to 10D illustrate a longitudinal aberration curve, an astigmatic curve, a distortion curve, and a lateral color curve of the optical imaging lens assembly of the example 5, respectively;

FIG. 11 illustrates a schematic structural view of an optical imaging lens assembly according to example 6 of the present disclosure;

DETAILED DESCRIPTION OF EMBODIMENTS

Figure 1:
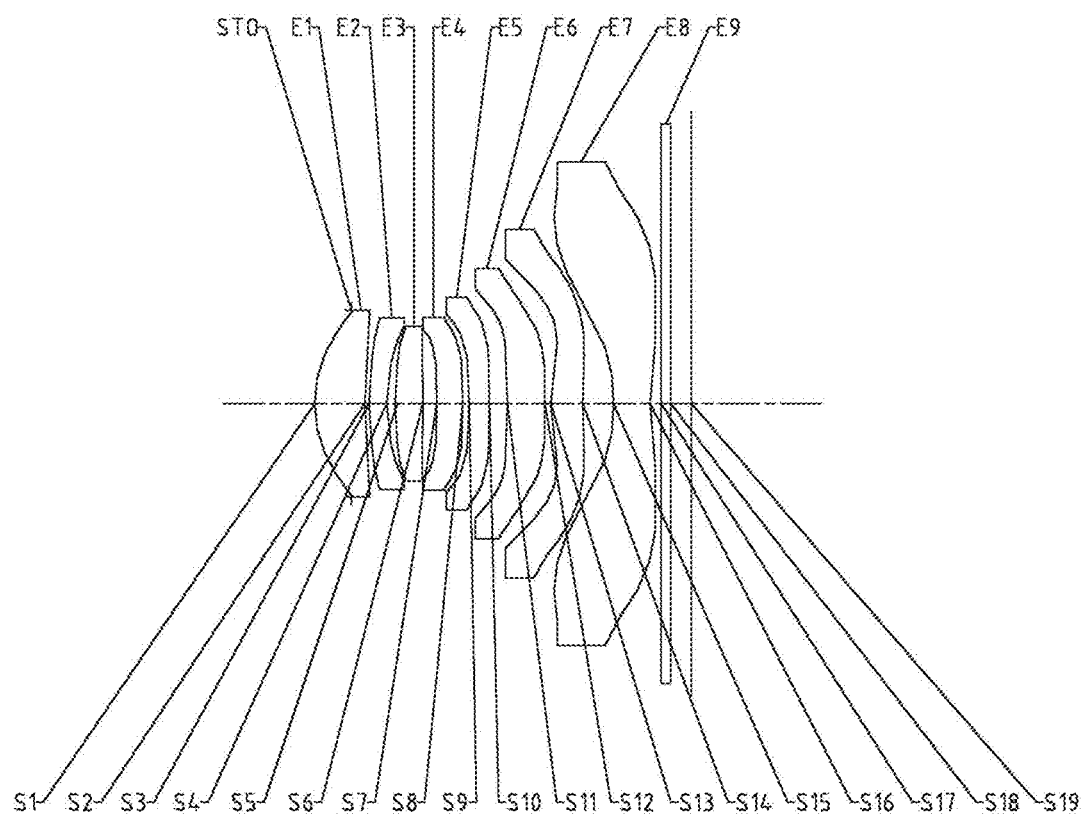
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include eight lenses having refractive power, which are a first lens, a second lens, a third lens, a fourth lens, a fifth lens, a sixth lens, a seventh lens and an eighth lens. The eight lenses are arranged sequentially from an object side to an image side along an optical axis. At least one of the first lens to the eighth lens has an aspheric surface. Among the first lens to the eighth lens, there may be a spaced interval between each two adjacent lenses.

In an exemplary embodiment, the first lens may have positive or negative refractive power; the second lens may have positive or negative refractive power; the third lens may have positive or negative refractive power; the fourth lens may have positive or negative refractive power; the fifth lens may have positive or negative refractive power; the sixth lens may have positive or negative refractive power; the seventh lens may have positive or negative refractive power; and the eighth lens may have positive or negative refractive power.

In an exemplary embodiment, the optical imaging lens assembly according to the present disclosure may satisfy: $1.5<CT6/T56<2.6$, where CT6 is a center thickness of the sixth lens along the optical axis, and T56 is a spaced interval between the fifth lens and the sixth lens along the optical axis. More specifically, CT6 and T56 may further satisfy: $1.7<CT6/T56<2.6$. Satisfying $1.5<CT6/T56<2.6$ is beneficial to controlling the astigmatic in the sagittal direction.

In an exemplary embodiment, the optical imaging lens assembly according to the present disclosure may satisfy: $0.8 \leq T34/(T45+T67)<3.0$, where T34 is a spaced interval between the third lens and the fourth lens along the optical axis, T45 is a spaced interval between the fourth lens and the fifth lens along the optical axis, and T67 is a spaced interval between the sixth lens and the seventh lens along the optical axis. More specifically, T34, T45 and T67 may further satisfy: $0.8 \leq T34/(T45+T67)<2.7$. Satisfying $0.8 \leq T34/(T45+T67)<3.0$ may constrain the total length of the optical imaging lens assembly, and may offset a part of the coma in the tangential direction, which is beneficial to reducing the total coma of the entire lens system.

In an exemplary embodiment, the optical imaging lens assembly according to the present disclosure may satisfy: $1.0<TTL/ImgH<1.5$, where TTL is a distance along the optical axis from an object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy: $1.3<TTL/ImgH<1.4$. When $1.0<TTL/ImgH<1.5$ is satisfied, the total optical length of the lens system may be within a reasonable range while the imaging plane is enlarged, which is beneficial to achieving an ultra-thin lens system.

In an exemplary embodiment, the optical imaging lens assembly according to the present disclosure may satisfy: $2.0<f1/R1<3.6$, where f1 is an effective focal length of the first lens, and R1 is a radius of curvature of an object-side surface of the first lens. More specifically, f1 and R1 may further satisfy: $2.1<f1/R1<3.6$. Satisfying $2.0<f1/R1<3.6$ is beneficial to ensuring that the vector height of the object-side surface of the first lens is within the range suitable for manufacturing and processing. At the same time, it is beneficial to correct the on-axis spherical aberrations of the system.

In an exemplary embodiment, the optical imaging lens assembly according to the present disclosure may satisfy: $1.0<f5/R9<2.0$, where f5 is an effective focal length of the fifth lens, and R9 is a radius of curvature of an object-side surface of the fifth lens. More specifically, f5 and R9 may further satisfy: $1.1<f5/R9<2.0$. Satisfying $1.0<f5/R9<2.0$ is beneficial to ensuring that the shape of the object-side surface of the fifth lens meets the molding processing requirements. At the same time, it is beneficial to correct the astigmatic in the tangential direction of the lens system.

In an exemplary embodiment, the optical imaging lens assembly according to the present disclosure may satisfy: $0.5<R2/R5<2.5$, where R2 is a radius of curvature of an image-side surface of the first lens, and R5 is a radius of curvature of an object-side surface of the third lens. More specifically, R2 and R5 may further satisfy: $0.9<R2/R5<2.4$. Satisfying $0.5<R2/R5<2.5$ may limit the incident angle of the light in the central field-of-view reaching the first lens and the third lens to be small, which is beneficial to reducing the MTF tolerance sensitivity of the central field-of-view.

In an exemplary embodiment, the optical imaging lens assembly according to the present disclosure may satisfy: $1.0<R3/R4<2.0$, where R3 is a radius of curvature of an object-side surface of the second lens, and R4 is a radius of curvature of an image-side surface of the second lens. More specifically, R3 and R4 may further satisfy: $1.4<R3/R4<1.8$. Satisfying $1.0<R3/R4<2.0$ may effectively correct the Petzval field curvature of the lens system.

In an exemplary embodiment, the optical imaging lens assembly according to the present disclosure may satisfy: $0.5<CT7/T78<2.5$, where CT7 is a center thickness of the seventh lens along the optical axis, and T78 is a spaced interval between the seventh lens and the eighth lens along the optical axis. More specifically, CT7 and T78 may further satisfy: $0.9<CT7/T78<2.5$. Satisfying $0.5<CT7/T78<2.5$ may effectively ensure the total optical length of the system while controlling the center thickness of the seventh lens and the spaced interval between the seventh and eighth lenses along the optical axis, thereby correcting the axial chromatic aberrations of the lens system.

In an exemplary embodiment, the optical imaging lens assembly according to the present disclosure may satisfy: $1.5<CT1/CT3<4.0$, where CT1 is a center thickness of the first lens along the optical axis, and CT3 is a center thickness of the third lens along the optical axis. More specifically, CT1 and CT3 may further satisfy: $1.7<CT1/CT3<3.7$. Satisfying $1.5<CT1/CT3<4.0$ is beneficial to ensuring the processing and molding of the first lens and the third lens. At the same time, it is beneficial to reduce the amount of tangential coma.

In an exemplary embodiment, both of a refractive index of the second lens and a refractive index of the fifth lens of the optical imaging lens assembly of the present disclosure may be greater than 1.65. When the refractive index of the second lens and the refractive index of the fifth lens are both greater than 1.65, it is beneficial to reduce the lateral color in the off-axis field of the lens system, and offset partial chromatic aberrations.

In an exemplary embodiment, the optical imaging lens assembly according to the present disclosure may satisfy: $1.0<CT4/T34<2.0$, where CT4 is a center thickness of the fourth lens along the optical axis, and T34 is a spaced interval between the third lens and the fourth lens along the optical axis. Satisfying $1.0<CT4/T34<2.0$ is beneficial to improving the structural manufacturability of the fourth lens, so that the fourth lens and the third lens have sufficient assembly strength when used together.

In an exemplary embodiment, the optical imaging lens assembly according to the present disclosure may satisfy: $1.5<(CT8+T67)/CT5<4.0$, where CT5 is a center thickness of the fifth lens along the optical axis, CT8 is a center thickness of the eighth lens along the optical axis, and T67 is a spaced interval between the sixth lens and the seventh lens along the optical axis. More specifically, CT5, CT8 and T67 may further satisfy: $1.7<(CT8+T67)/CT5<3.9$. Satisfying $1.5<(CT8+T67)/CT5<4.0$ is beneficial to correcting the Petzval field curvature of the lens system, and constraining the optical distortion in the external field-of-view.

In an exemplary embodiment, the optical imaging lens assembly according to the present disclosure may satisfy: $Fno \leq 1.7$, where Fno is a relative F number of the optical imaging lens assembly. In an optical system with a large imaging plane, satisfying $Fno \leq 1.7$ may ensure that the optical system has a small F number. The smaller the F number is, the larger the effective clear aperture of the lens system will be, which is beneficial to improving the signal-to-noise ratio of the entire lens system.

In an exemplary embodiment, the fourth lens may have positive refractive power, an object-side surface thereof may be a concave surface, and an image-side surface thereof may be a convex surface. The shape design of the fourth lens may allow the fourth lens to assume part of the positive refractive power. The concave-convex surface shape of the fourth lens is beneficial to reducing the ghost energy generated by the two specular reflections.

In an exemplary embodiment, an object-side surface of the fifth lens may be a concave surface, and an image-side surface thereof may be a concave surface. The shape design of the fifth lens may effectively control the shape of the fifth lens, which is beneficial to correcting the astigmatic and coma in the tangential direction of the lens system.

In an exemplary embodiment, the optical imaging lens assembly according to the present disclosure may satisfy: $-4.5<R15/R3<-1.0$, where R3 is a radius of curvature of an object-side surface of the second lens, and R15 is a radius of curvature of an object-side surface of the eighth lens. More specifically, R15 and R3 may further satisfy: $-4.4<R15/R3<-1.3$. Satisfying $-4.5<R15/R3<-1.0$ is beneficial to improving the image quality.

In an exemplary embodiment, the optical imaging lens assembly according to the present disclosure may satisfy: $1.5<T78/T67<7.0$, where T67 is a spaced interval between the sixth lens and the seventh lens along the optical axis, and T78 is a spaced interval between the seventh lens and the eighth lens along the optical axis. More specifically, T78 and T67 may further satisfy: $1.6<T78/T67<6.7$. Satisfying $1.5<T78/T67<7.0$ is beneficial to correcting the Petzval field curvature of the lens system restraining the total length of the lens system.

In an exemplary embodiment, the optical imaging lens assembly according to the present disclosure may further include a stop disposed between the object side and the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as eight lenses as described above. By properly configuring the refractive power of each lens, the surface shape, the center thickness of each lens, and spaced intervals along the optical axis between the lenses, the size of the optical imaging lens assembly may be effectively reduced, and the workability of the optical imaging lens assembly may be improved, such that the optical imaging lens assembly is more advantageous for production processing and may be applied to portable electronic products. The optical imaging lens assembly configured as described above may have at least one beneficial effect such as a large image plane, a large aperture, ultra-thinness, and good image quality.

In the embodiments of the present disclosure, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens and the eighth lens is aspheric. Optionally, the object-side surface and the image-side surface of each of the first lens, the second lens, the third lens, the fourth lens, the fifth lens, the sixth lens, the seventh lens and the eighth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface M5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 1 is a table illustrating basic parameters of the optical imaging lens assembly of example 1, wherein the units for the radius of curvature, the thickness/distance and the focal length are millimeter (mm).

In this example, a total effective focal length f of the optical imaging lens assembly is 6.71 mm, a total length TTL of the optical imaging lens assembly (i.e., a distance along the optical axis from the object-side surface S1 of the first lens E1 to the imaging surface S19 of the optical imaging lens assembly) is 8.21 mm, half of a diagonal length ImgH of an effective pixel area on the imaging plane S19 of the optical imaging lens assembly is 6.28 mm, half of a field-of-view Semi-FOV of the optical imaging lens assembly is 42.36°, and a relative F number Fno of the optical imaging lens assembly is 1.70.

In example 1, the object-side surface and the image-side surface of any one of the first lens E1 to the eighth lens E8 are aspheric. The surface shape x of each aspheric lens may be defined by using, but not limited to, the following aspheric formula:

$$x = \frac{ch^2}{1 + \sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S16 in example 1.

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8000 | | | | |
| S1 | Aspheric | 2.6909 | 1.0864 | 1.55 | 56.1 | 6.54 | 0.0069 |
| S2 | Aspheric | 9.3667 | 0.1000 | | | | −1.3564 |
| S3 | Aspheric | 6.1626 | 0.3800 | 1.68 | 19.2 | −17.74 | −0.3524 |
| S4 | Aspheric | 3.9711 | 0.1889 | | | | 0.1749 |
| S5 | Aspheric | 9.2509 | 0.6005 | 1.55 | 56.1 | 18.74 | 0.6834 |
| S6 | Aspheric | 94.3907 | 0.3042 | | | | −99.0000 |
| S7 | Aspheric | −38.1307 | 0.5662 | 1.55 | 56.1 | 100.00 | −99.0000 |
| S8 | Aspheric | −22.5679 | 0.1441 | | | | 30.1154 |
| S9 | Aspheric | −21.4591 | 0.4396 | 1.68 | 19.2 | −26.06 | 87.8251 |
| S10 | Aspheric | 100.0000 | 0.3897 | | | | −99.0000 |
| S11 | Aspheric | −28.6788 | 0.8201 | 1.57 | 37.4 | −17.33 | −1.0580 |
| S12 | Aspheric | 15.2222 | 0.1267 | | | | −13.2004 |
| S13 | Aspheric | 2.5951 | 0.6967 | 1.54 | 55.7 | 6.19 | −0.9731 |
| S14 | Aspheric | 10.7478 | 0.6701 | | | | 2.7274 |
| S15 | Aspheric | −8.3688 | 0.7943 | 1.54 | 55.7 | −4.77 | −0.1676 |
| S16 | Aspheric | 3.8091 | 0.2469 | | | | −1.1097 |
| S17 | Spherical | Infinite | 0.2100 | 1.52 | 64.2 | | |
| S18 | Spherical | Infinite | 0.4431 | | | | |
| S19 | Spherical | Infinite | | | | | |

TABLE 2

| Surface number | A4 | A6 | A8 | A10 | A12 | A14 | A16 | A18 | A20 |
|---|---|---|---|---|---|---|---|---|---|
| S1 | −1.7580E−02 | −7.5002E−03 | −2.4803E−03 | −6.5163E−04 | −1.4564E−04 | −2.0317E−05 | −3.2303E−06 | 4.6144E−06 | 4.9869E−07 |
| S2 | −6.9423E−02 | 3.3179E−03 | −2.6005E−03 | 4.0020E−04 | 4.5595E−05 | −6.4568E−06 | 5.3291E−06 | −7.2546E−07 | 4.5732E−06 |
| S3 | −7.9122E−02 | 1.9693E−02 | −4.1126E−04 | 5.6132E−04 | 6.7489E−05 | −4.3980E−05 | 6.1095E−06 | −1.2691E−06 | 3.5800E−06 |
| S4 | −8.7764E−03 | 2.2104E−02 | 3.3428E−03 | −1.2306E−03 | −1.8768E−03 | −1.1617E−03 | −3.8002E−04 | −7.1469E−05 | 1.9536E−06 |
| S5 | 3.0215E−02 | 8.7153E−03 | 4.9798E−03 | 1.3365E−03 | 2.5113E−04 | −1.4903E−05 | −3.6670E−05 | −5.7640E−06 | −1.0686E−06 |
| S6 | 1.5424E−02 | 6.5880E−02 | 2.8280E−02 | 6.4241E−03 | 3.1805E−03 | 2.1534E−03 | 1.0129E−03 | 1.3565E−04 | −1.2694E−04 |
| S7 | −1.7440E−01 | −1.9356E−02 | −1.2063E−03 | −5.5432E−04 | −1.9817E−04 | −6.1714E−05 | 7.3307E−06 | 8.3837E−08 | 3.5896E−06 |
| S8 | −2.7005E−01 | −2.3311E−02 | 5.8278E−03 | 1.1680E−04 | 1.3850E−04 | 4.3120E−04 | 3.4064E−04 | 6.2636E−06 | 2.1435E−05 |
| S9 | −3.8902E−01 | −2.2200E−02 | −3.0084E−03 | −8.4895E−04 | 1.1819E−03 | 1.4178E−03 | 4.2401E−04 | 2.7764E−05 | 2.3849E−04 |
| S10 | −5.7407E−01 | 6.3839E−03 | 4.3768E−03 | 3.5221E−03 | 6.4777E−05 | −2.3602E−03 | −1.5106E−03 | −3.3450E−04 | 3.5085E−04 |
| S11 | −6.2464E−01 | −4.5110E−02 | 5.2965E−02 | 1.3230E−02 | 3.7725E−03 | −2.0100E−03 | −2.3167E−03 | −1.2832E−03 | 3.4560E−04 |
| S12 | −1.6500E+00 | 3.8757E−01 | −5.7374E−02 | 1.0529E−02 | −9.1896E−03 | 1.2575E−02 | −5.7969E−03 | 4.9876E−04 | −1.3021E−03 |
| S13 | −5.2230E+00 | 1.2238E+00 | −1.7456E−01 | −8.7814E−03 | −2.2694E−02 | 2.4827E−02 | −9.8801E−03 | −4.8627E−03 | −1.6013E−02 |
| S14 | −2.6967E+00 | 6.2336E−01 | 7.7049E−03 | 6.0165E−03 | 6.7347E−03 | 1.3732E−02 | 9.8856E−03 | −1.7001E−03 | −1.0554E−02 |
| S15 | 5.4883E−01 | 7.8985E−01 | −6.1480E−01 | 2.9453E−01 | −1.2664E−01 | 8.1033E−02 | −2.3124E−02 | 2.6376E−02 | −1.3217E−02 |
| S16 | −5.9305E+00 | 1.2942E+00 | −2.8747E−01 | 1.9092E−01 | −1.1440E−01 | 4.8530E−02 | −2.0396E−02 | 2.4214E−02 | 2.4373E−03 |

Figures 2A, 2B:
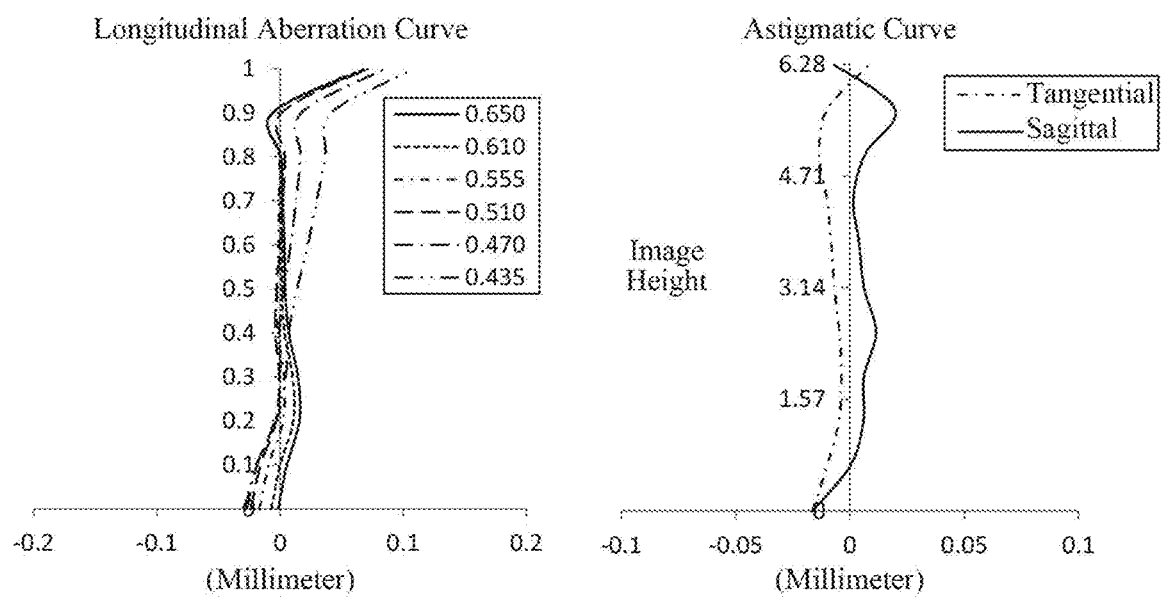
FIGS. 2A to 2D illustrate a longitudinal aberration curve, an astigmatic curve, a distortion curve, and a lateral color curve of the optical imaging lens assembly of the example 1, respectively.
Figure 2C:
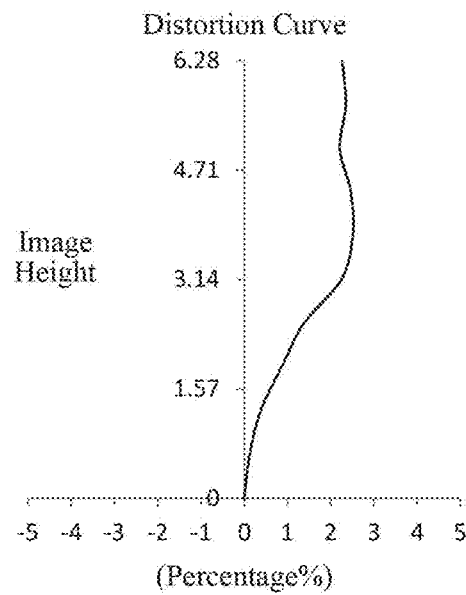
Figure 2D:
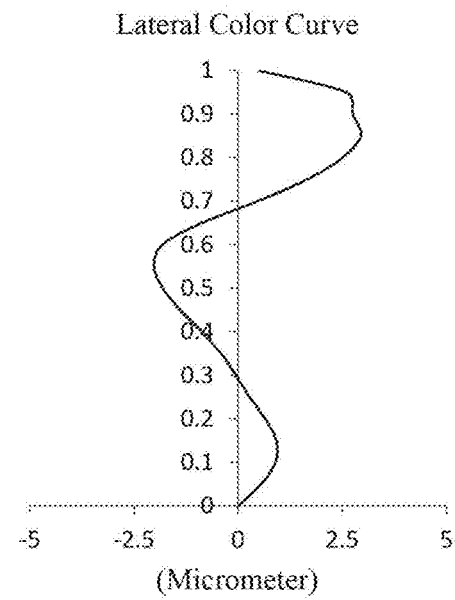

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
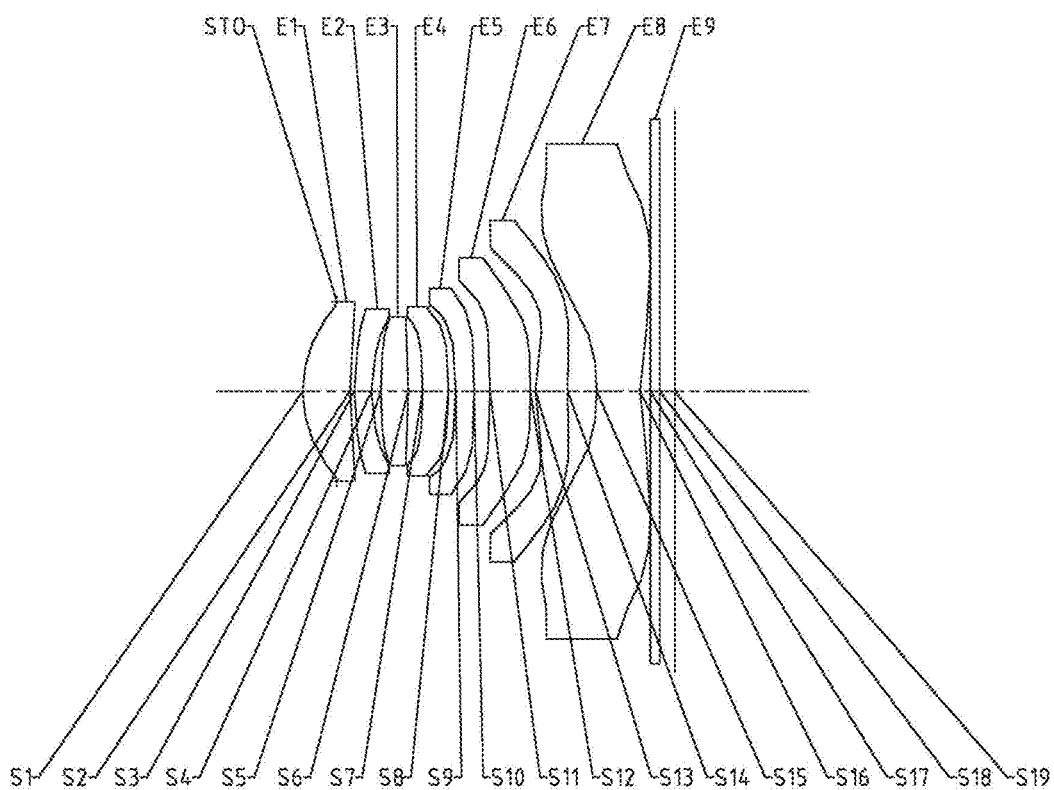
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S1i thereof is a concave surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.65 mm, a total length TTL of the optical imaging lens assembly is 8.31 mm, half of a diagonal length ImgH of an effective pixel area on the imaging plane S19 of the optical imaging lens assembly is 6.25 mm, half of a field-of-view Semi-FOV of the optical imaging lens assembly is 42.47°, and a relative F number Fno of the optical imaging lens assembly is 1.69.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| STO | Spherical | Infinite | −0.7666 | | | | |

TABLE 3-continued

| Surface number | Surface type | Radius of curvature | Thickness/ Distance | Material Refractive index | Abbe number | Focal length | Conic coefficient |
|---|---|---|---|---|---|---|---|
| S1 | Aspheric | 2.7436 | 1.0574 | 1.55 | 56.1 | 6.64 | 0.0041 |
| S2 | Aspheric | 9.7582 | 0.1000 | | | | −0.6679 |
| S3 | Aspheric | 5.5881 | 0.3800 | 1.68 | 19.2 | −18.74 | −0.4089 |
| S4 | Aspheric | 3.7727 | 0.2086 | | | | 0.2136 |
| S5 | Aspheric | 10.2299 | 0.6131 | 1.55 | 56.1 | 17.03 | 1.2176 |
| S6 | Aspheric | −100.0000 | 0.3188 | | | | 99.0000 |
| S7 | Aspheric | −23.1272 | 0.5782 | 1.55 | 56.1 | 100.00 | −99.0000 |
| S8 | Aspheric | −16.3887 | 0.1636 | | | | 13.2009 |
| S9 | Aspheric | −16.6470 | 0.4114 | 1.68 | 19.2 | −21.05 | 74.0061 |
| S10 | Aspheric | 100.0000 | 0.3536 | | | | −99.0000 |
| S11 | Aspheric | −35.0072 | 0.8996 | 1.57 | 37.4 | −22.51 | 94.3203 |
| S12 | Aspheric | 20.4383 | 0.1157 | | | | −21.6158 |
| S13 | Aspheric | 2.7904 | 0.7171 | 1.54 | 55.7 | 6.74 | −0.9406 |
| S14 | Aspheric | 11.0976 | 0.6517 | | | | 0.1295 |
| S15 | Aspheric | −8.9065 | 0.9702 | 1.54 | 55.7 | −4.80 | −0.4237 |
| S16 | Aspheric | 3.7595 | 0.2290 | | | | −1.1290 |
| S17 | Spherical | Infinite | 0.2100 | 1.52 | 64.2 | | |
| S18 | Spherical | Infinite | 0.3338 | | | | |
| S19 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −1.7402E−02 | −8.0451E−03 | −2.4885E−03 | −6.0646E−04 | −1.1746E−04 | −9.4364E−06 | 6.0002E−07 | 3.6657E−06 | 5.4048E−08 |
| S2 | −6.8263E−02 | 3.6059E−03 | −2.5419E−03 | 4.7010E−04 | 6.1781E−06 | 3.7951E−06 | 6.4701E−06 | −1.0330E−07 | 5.5570E−06 |
| S3 | −7.9358E−02 | 2.0013E−02 | −2.9231E−04 | 5.2002E−04 | 7.0032E−06 | −4.3474E−05 | 9.0484E−07 | −2.3796E−06 | 6.0362E−06 |
| S4 | −7.8313E−03 | 2.3244E−02 | 4.1749E−03 | −3.4791E−04 | −1.6842E−03 | −1.3668E−03 | −6.4624E−04 | −2.1067E−04 | −3.5383E−05 |
| S5 | 3.0816E−02 | 6.7367E−03 | 4.1126E−03 | 1.4770E−03 | 4.0468E−04 | 6.3925E−05 | −2.6284E−05 | −1.5318E−05 | −1.0930E−05 |
| S6 | −1.1940E−02 | 7.2111E−02 | 3.2799E−02 | 5.2004E−03 | 1.3370E−03 | 2.2592E−03 | 1.8104E−03 | 5.5020E−04 | −5.8189E−05 |
| S7 | −1.7197E−01 | −1.8173E−02 | −1.2851E−03 | −5.3881E−04 | −1.3744E−04 | −5.4544E−05 | 4.9955E−06 | −7.7982E−06 | 2.5707E−06 |
| S8 | −2.6078E−01 | −2.6886E−02 | 2.1906E−03 | −1.2077E−03 | −2.8308E−04 | 2.6318E−04 | 1.6498E−04 | −1.7882E−05 | −2.2283E−06 |
| S9 | −3.8164E−01 | −1.9779E−02 | −3.3446E−03 | −4.8516E−04 | 1.9107E−03 | 1.8390E−03 | 4.0572E−04 | 7.8042E−05 | 2.3308E−04 |
| S10 | −6.2483E−01 | 1.0310E−02 | 6.8601E−03 | 5.1062E−03 | 6.0050E−04 | −2.5851E−03 | −2.1551E−03 | −5.2705E−04 | 2.8414E−04 |
| S11 | −6.4153E−01 | −6.0063E−02 | 5.1351E−02 | 1.7831E−02 | 6.3020E−03 | −1.7830E−03 | −2.9935E−03 | −1.5045E−03 | 3.1355E−04 |
| S12 | −1.6647E+00 | 3.7759E−01 | −5.4797E−02 | 1.3163E−02 | −9.5984E−03 | 1.1807E−02 | −6.0774E−03 | 1.7982E−03 | −1.6288E−03 |
| S13 | −5.1685E+00 | 1.0826E+00 | −1.4266E−01 | −2.0994E−03 | −2.0243E−02 | 2.3156E−02 | −1.4123E−02 | −6.2361E−03 | −1.7743E−02 |
| S14 | −2.8080E+00 | 5.9418E−01 | 3.5541E−03 | 1.8028E−02 | 4.0143E−03 | 1.9589E−02 | 9.9145E−03 | −1.4680E−03 | −1.3577E−02 |
| S15 | 6.4353E−01 | 7.8775E−01 | −6.1669E−01 | 2.9592E−01 | −1.4074E−01 | 8.3543E−02 | −2.2010E−02 | 2.7151E−02 | −1.0736E−02 |
| S16 | −5.9053E+00 | 1.3388E+00 | −3.0056E−01 | 2.1095E−01 | −1.2042E−01 | 4.6831E−02 | −2.3629E−02 | 1.8997E−02 | 3.5076E−04 |

Figure 4A:
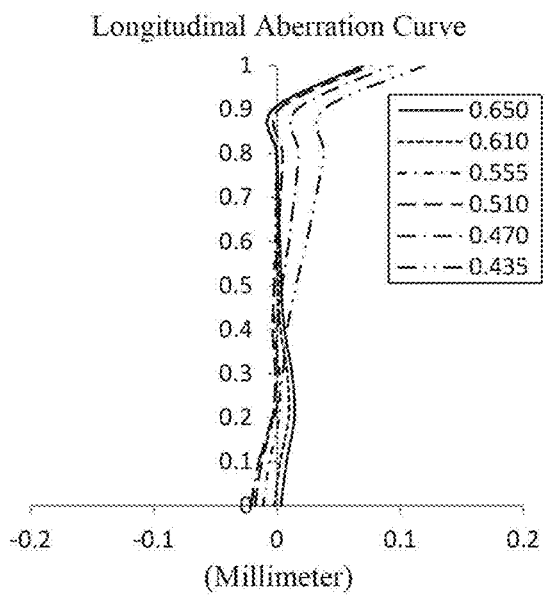
FIGS. 4A to 4D illustrate a longitudinal aberration curve, an astigmatic curve, a distortion curve, and a lateral color curve of the optical imaging lens assembly of the example 2, respectively.
Figure 4B:
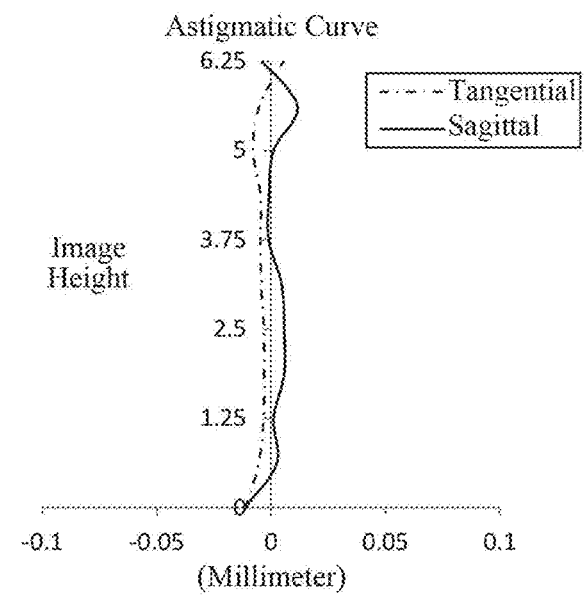
Figure 4C:
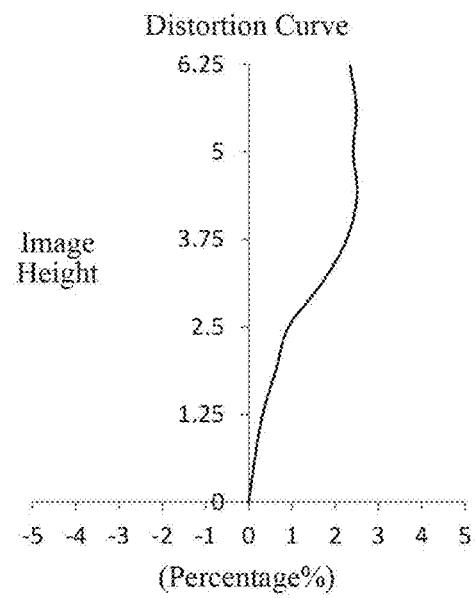
Figure 4D:
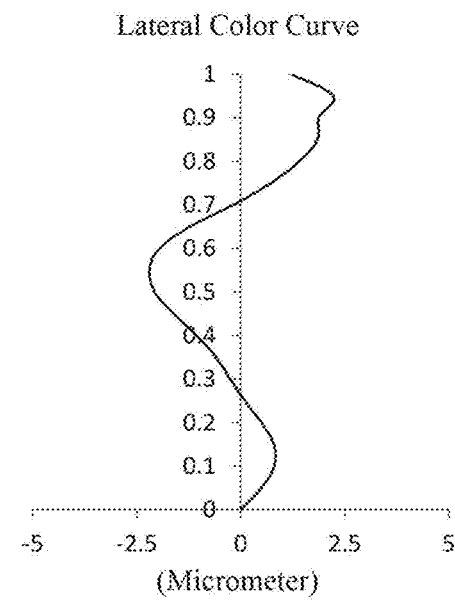

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

Figure 6C:
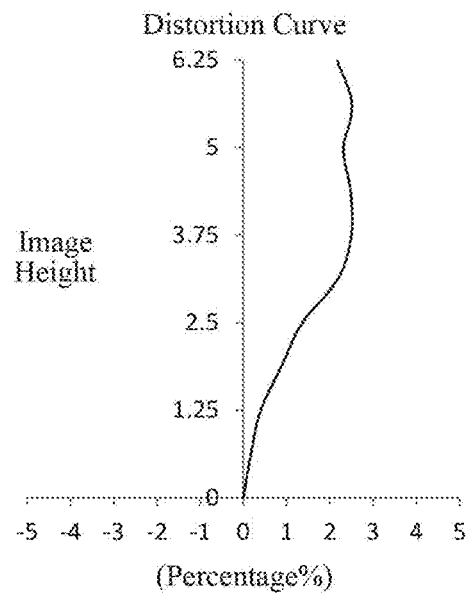
Figure 6D:
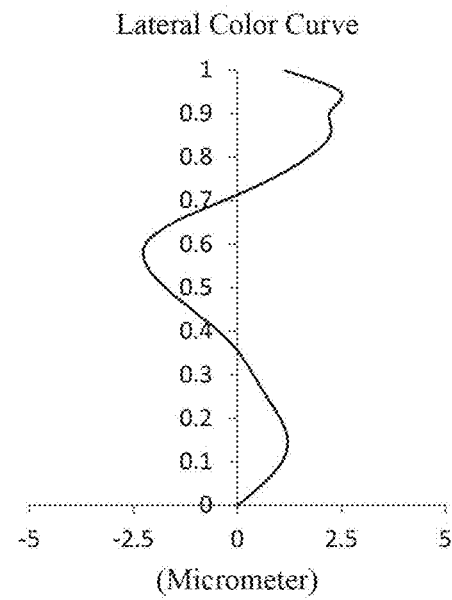

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7823 | | | | |
| S1 | Aspheric | 2.7110 | 1.0720 | 1.55 | 56.1 | 6.58 | 0.0070 |
| S2 | Aspheric | 9.4867 | 0.1000 | | | | −1.6204 |
| S3 | Aspheric | 5.8128 | 0.3800 | 1.68 | 19.2 | −17.82 | −0.4248 |
| S4 | Aspheric | 3.8190 | 0.1987 | | | | 0.2133 |
| S5 | Aspheric | 9.3735 | 0.5951 | 1.55 | 56.1 | 18.90 | 0.6423 |
| S6 | Aspheric | 100.0305 | 0.3129 | | | | −99.0000 |
| S7 | Aspheric | −32.8848 | 0.5722 | 1.55 | 56.1 | 100.00 | −99.0000 |
| S8 | Aspheric | −20.6488 | 0.1470 | | | | −1.1029 |
| S9 | Aspheric | −18.9965 | 0.4327 | 1.68 | 19.2 | −22.01 | 77.5456 |
| S10 | Aspheric | 69.6671 | 0.3594 | | | | −99.0000 |
| S11 | Aspheric | 98.0000 | 0.8298 | 1.57 | 37.4 | −19.47 | −99.0000 |
| S12 | Aspheric | 9.9352 | 0.1530 | | | | −10.9736 |
| S13 | Aspheric | 2.5429 | 0.6660 | 1.54 | 55.7 | 6.15 | −0.9848 |
| S14 | Aspheric | 10.0858 | 0.6813 | | | | 1.8492 |
| S15 | Aspheric | −8.6363 | 0.8913 | 1.54 | 55.7 | −4.81 | −0.1558 |
| S16 | Aspheric | 3.8155 | 0.2208 | | | | −1.1897 |
| S17 | Spherical | Infinite | 0.2100 | 1.52 | 64.2 | | |
| S18 | Spherical | Infinite | 0.4170 | | | | |
| S19 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −1.7168E−02 | −7.8080E−03 | −2.5163E−03 | −6.5044E−04 | −1.3675E−04 | −1.6338E−05 | −9.7138E−07 | 3.4148E−06 | 3.2158E−07 |
| S2 | −6.9844E−02 | 3.1043E−03 | −2.5689E−03 | 3.3971E−04 | 2.9766E−05 | −1.4011E−05 | 4.4359E−06 | −3.3489E−06 | 4.2799E−06 |
| S3 | −7.9560E−02 | 1.9846E−02 | −2.6421E−04 | 4.6743E−04 | 5.6812E−05 | −5.5763E−05 | 1.1609E−06 | −4.3059E−06 | 4.2418E−06 |
| S4 | −7.8232E−03 | 2.2543E−02 | 3.7662E−03 | −9.2831E−04 | −1.9565E−03 | −1.4969E−03 | −6.8572E−04 | −2.2274E−04 | −4.0080E−05 |
| S5 | 3.0245E−02 | 7.4796E−03 | 4.5689E−03 | 1.4282E−03 | 3.7681E−04 | 5.0459E−05 | −2.6892E−05 | −1.2546E−05 | −8.3054E−06 |
| S6 | 6.5182E−03 | 6.7332E−03 | 2.9536E−02 | 6.2005E−03 | 2.7384E−03 | 2.1199E−03 | 1.1506E−03 | 1.9983E−03 | −1.3175E−04 |
| S7 | −1.7128E−01 | −1.9223E−02 | −1.3439E−03 | 6.4297E−04 | −1.9496E−04 | −6.2700E−05 | 5.2444E−06 | −4.4880E−06 | 3.0491E−06 |
| S8 | −2.6525E−01 | −2.5009E−02 | 4.8612E−03 | −4.5033E−04 | 1.1435E−04 | 3.6921E−04 | 2.6746E−04 | −1.2837E−05 | 1.7171E−05 |
| S9 | −3.8472E−01 | −2.1015E−02 | −2.8927E−03 | −3.9420E−04 | 1.7470E−03 | 1.1814E−03 | 6.3166E−05 | −9.9795E−05 | 2.3060E−04 |
| S10 | −5.9709E−01 | 1.6107E−02 | 5.9814E−03 | 5.5194E−03 | 7.7863E−04 | −2.6810E−03 | −1.6192E−03 | −2.7267E−04 | 3.6970E−04 |
| S11 | −6.5510E−01 | 4.2298E−02 | 4.5730E−02 | 1.4210E−02 | 4.8885E−03 | −1.8853E−03 | −2.3294E−03 | −1.0453E−03 | 3.7350E−04 |
| S12 | −1.6483E+00 | 3.8502E−01 | −5.2896E−02 | 1.2724E−02 | −1.0899E−02 | 1.2084E−02 | −5.2585E−03 | 1.5968E−03 | −1.3659E−03 |
| S13 | −5.2417E+00 | 1.1586E+00 | −1.5104E−01 | −1.6376E−03 | −2.1349E−02 | 2.3460E−02 | −1.6124E−02 | −2.2891E−03 | −1.3327E−02 |
| S14 | −2.7861E+00 | 6.1069E−01 | 3.0729E−03 | 1.9333E−02 | −6.3146E−04 | 1.9878E−02 | 6.2879E−03 | −4.3748E−04 | −1.1527E−02 |
| S15 | 5.7118E−01 | 7.7648E−01 | −6.0696E−01 | 2.9990E−01 | −1.3021E−01 | 7.8517E−02 | −2.0082E−02 | 2.3702E−02 | −1.1528E−02 |
| S16 | −5.8581E+00 | 1.3058E+00 | −3.0136E−01 | 1.7011E−01 | −1.1176E−01 | 5.0619E−02 | −1.9048E−02 | 2.1448E−02 | 6.3496E−04 | concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.68 mm, a total length TTL of the optical imaging lens assembly is 8.24 mm, half of a diagonal length ImgH of an effective pixel area on the imaging plane S19 of the optical imaging lens assembly is 6.23 mm, half of a field-of-view Semi-FOV of the optical imaging lens assembly is 42.28°, and a relative F number Fno of the optical imaging lens assembly is 1.70.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

Figure 7:
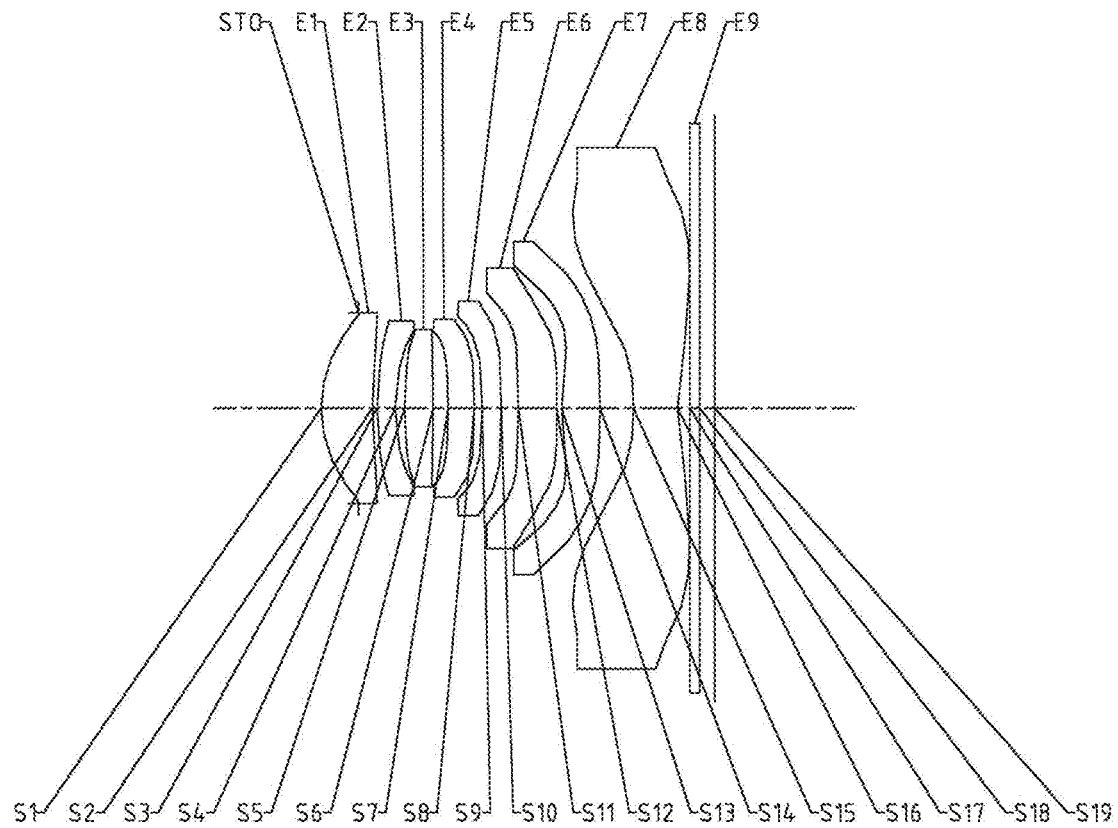
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.71 mm, a total length TTL of the optical imaging lens assembly is 8.32 mm, half of a diagonal length ImgH of an effective pixel area on the imaging plane S19 of the optical imaging lens assembly is 6.21 mm, half of a field-of-view Semi-FOV of the optical imaging lens assembly is 42.020, and a relative F number Fno of the optical imaging lens assembly is 1.69.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7887 | | | | |
| S1 | Aspheric | 2.7354 | 1.0809 | 1.55 | 56.1 | 6.57 | 0.0081 |
| S2 | Aspheric | 9.9212 | 0.1000 | | | | −0.8026 |
| S3 | Aspheric | 5.7546 | 0.3800 | 1.68 | 19.2 | −17.73 | −0.4375 |
| S4 | Aspheric | 3.7857 | 0.2021 | | | | 0.2379 |
| S5 | Aspheric | 9.3500 | 0.6057 | 1.55 | 56.1 | 18.15 | 0.9879 |
| S6 | Aspheric | 161.7009 | 0.3117 | | | | −99.0000 |
| S7 | Aspheric | −32.9896 | 0.5569 | 1.55 | 56.1 | 100.00 | −99.0000 |
| S8 | Aspheric | −20.6860 | 0.1661 | | | | −63.6087 |
| S9 | Aspheric | −20.7599 | 0.4007 | 1.68 | 19.2 | −25.36 | 99.0000 |
| S10 | Aspheric | 100.0000 | 0.3647 | | | | −99.0000 |
| S11 | Aspheric | −30.4248 | 0.8065 | 1.57 | 37.4 | −15.59 | 15.2217 |
| S12 | Aspheric | 12.6747 | 0.1069 | | | | −12.2116 |
| S13 | Aspheric | 3.3156 | 0.8097 | 1.54 | 55.7 | 5.99 | −0.7842 |
| S14 | Aspheric | −96.7069 | 0.7118 | | | | 99.0000 |
| S15 | Aspheric | −8.5465 | 0.9327 | 1.54 | 55.7 | −4.67 | −0.5011 |
| S16 | Aspheric | 3.6751 | 0.2546 | | | | −1.1344 |
| S17 | Spherical | Infinite | 0.2100 | 1.52 | 64.2 | | |
| S18 | Spherical | Infinite | 0.3193 | | | | |
| S19 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −1.7146E−02 | −7.7004E−03 | −2.4172E−03 | −5.9696E−04 | −1.2117E−04 | −1.3514E−05 | −4.8890E−07 | 3.6682E−06 | 6.9270E−08 |
| S2 | −6.8620E−02 | 3.1512E−03 | −2.5859E−03 | 4.4164E−04 | −7.4750E−06 | 3.2330E−06 | 1.1208E−06 | −2.4431E−06 | 4.0008E−06 |
| S3 | −7.9575E−02 | 1.9947E−02 | −3.2257E−04 | 5.4313E−04 | 1.9427E−05 | −3.5340E−05 | −1.0079E−06 | −4.4567E−06 | 4.7926E−06 |
| S4 | −7.5907E−03 | 2.4759E−02 | 4.8665E−03 | 5.0306E−05 | −1.3766E−03 | −1.1852E−03 | −5.7707E−04 | −1.9573E−04 | −3.5573E−05 |
| S5 | 3.0721E−02 | 6.6049E−03 | 4.0881E−03 | 1.3722E−03 | 3.7070E−04 | 6.5312E−05 | −1.8976E−05 | −1.0350E−05 | −9.3477E−06 |
| S6 | −5.5768E−03 | 6.8746E−02 | 3.2550E−02 | 5.5265E−03 | 1.3954E−03 | 2.1223E−03 | 1.8166E−05 | 6.3719E−04 | −1.3233E−05 |
| S7 | −1.6487E−01 | −1.8996E−02 | −1.2672E−03 | −5.3471E−04 | −1.2271E−04 | −5.8794E−05 | 1.2556E−05 | −3.9730E−06 | 2.4783E−06 |
| S8 | −2.6028E−01 | −2.4177E−02 | 4.1946E−03 | −7.5435E−04 | −9.5141E−06 | 2.0668E−04 | 3.0251E−04 | −1.2228E−06 | 1.0791E−05 |
| S9 | −4.0450E−01 | −1.9670E−02 | −3.4291E−03 | −1.1302E−03 | 2.5676E−03 | 2.2130E−03 | 8.6366E−04 | 5.1026E−05 | 2.3096E−04 |
| S10 | −6.0765E−01 | 1.9773E−02 | 8.6571E−03 | 4.2383E−03 | 1.0654E−03 | −2.4321E−03 | −1.7570E−03 | −7.3446E−04 | 2.9356E−04 |

TABLE 8-continued

| Surface number | A4 | A6 | A8 | A10 | A12 | A14 | A16 | A18 | A20 |
|---|---|---|---|---|---|---|---|---|---|
| S11 | −6.2797E−01 | −4.5458E−02 | 5.3044E−02 | 1.5008E−02 | 4.0507E−03 | −1.7892E−03 | −1.1035E−03 | −6.2561E−04 | 4.4981E−04 |
| S12 | −1.6532E+00 | 3.8923E−01 | −5.1636E−02 | 3.5845E−03 | −8.0699E−03 | 1.2709E−02 | −3.3661E−03 | 2.6732E−03 | −1.7338E−03 |
| S13 | −5.0316E+00 | 1.0030E+00 | −1.3037E−01 | −4.8658E−03 | −2.5200E−02 | 2.4107E−02 | −7.3701E−03 | −1.0535E−02 | −1.9564E−02 |
| S14 | −2.4685E+00 | 5.0637E−01 | 3.4941E−02 | 1.9371E−03 | −1.6993E−02 | 2.5586E−02 | 2.0321E−02 | −4.5709E−03 | −1.4943E−02 |
| S15 | 6.9383E−01 | 7.9541E−01 | −6.1520E−01 | 2.8707E−01 | −1.3472E−01 | 8.3753E−02 | −1.5958E−02 | 2.7738E−02 | −7.4231E−03 |
| S16 | −5.9270E+00 | 1.3303E+00 | −2.9068E−01 | 2.3634E−01 | −1.0156E−01 | 5.7465E−02 | −1.2509E−02 | 2.4339E−02 | 1.1233E−03 |

Figure 8A:
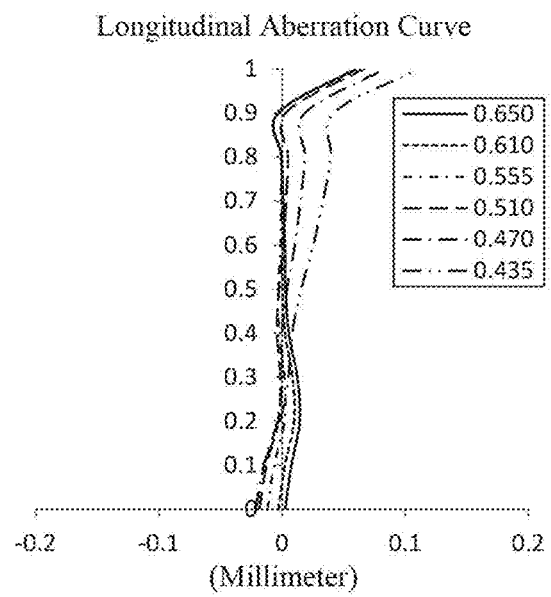
FIGS. 8A to 8D illustrate a longitudinal aberration curve, an astigmatic curve, a distortion curve, and a lateral color curve of the optical imaging lens assembly of the example 4, respectively.
Figure 8B:
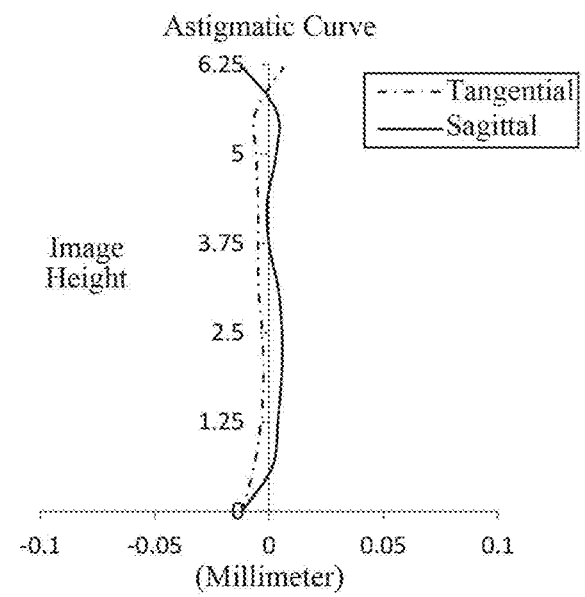
Figure 8C:
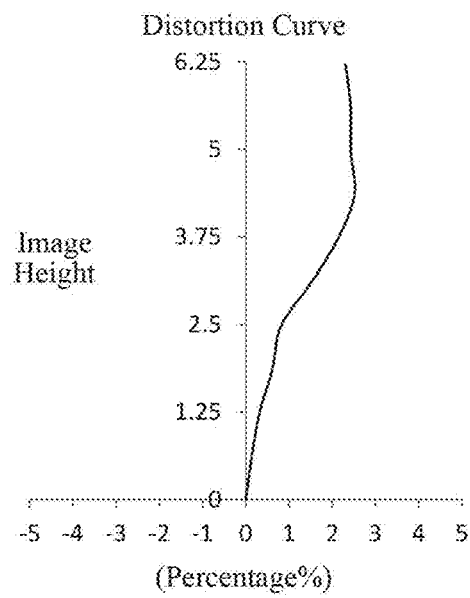
Figure 8D:
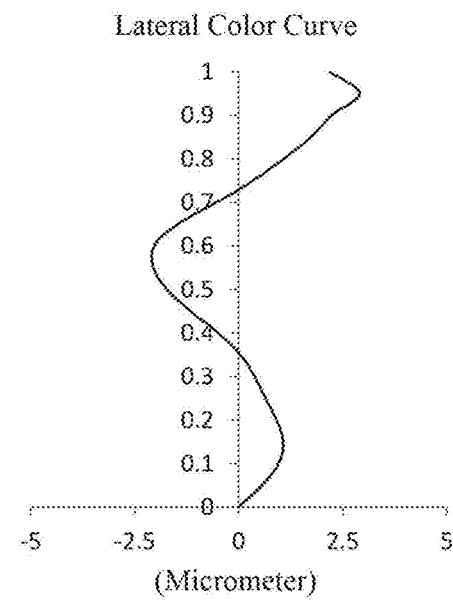

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
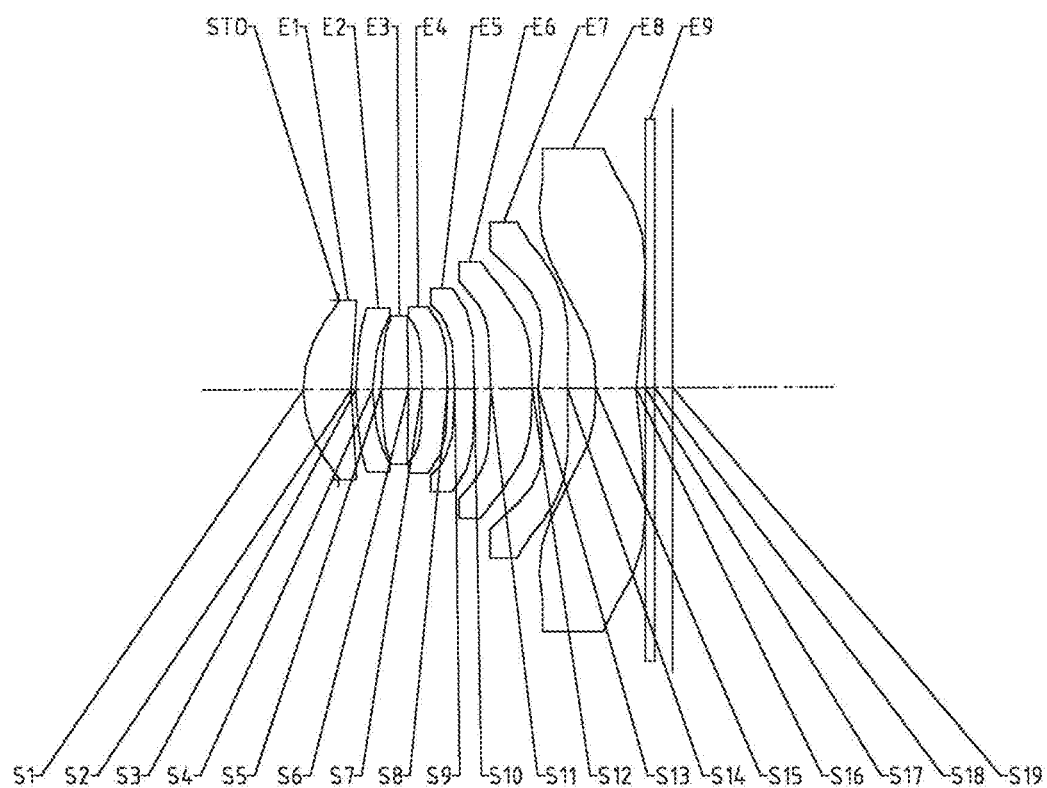
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a convex surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.71 mm, a total length TTL of the optical imaging lens assembly is 8.34 mm, half of a diagonal length ImgH of an effective pixel area on the imaging plane S19 of the optical imaging lens assembly is 6.35 mm, half of a field-of-view Semi-FOV of the optical imaging lens assembly is 42.68°, and a relative F number Fno of the optical imaging lens assembly is 1.68.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8001 | | | | |
| S1 | Aspheric | 2.7220 | 1.0822 | 1.55 | 56.1 | 6.71 | 0.0136 |
| S2 | Aspheric | 9.1245 | 0.1000 | | | | −1.4755 |
| S3 | Aspheric | 5.7687 | 0.3800 | 1.68 | 19.2 | −19.10 | −0.4786 |
| S4 | Aspheric | 3.8831 | 0.2015 | | | | 0.2770 |
| S5 | Aspheric | 9.3076 | 0.6138 | 1.55 | 56.1 | 17.97 | 0.3279 |
| S6 | Aspheric | 176.7497 | 0.3078 | | | | −99.0000 |
| S7 | Aspheric | −31.4906 | 0.5722 | 1.55 | 56.1 | 96.87 | −99.0000 |
| S8 | Aspheric | −19.8642 | 0.1609 | | | | 11.2990 |
| S9 | Aspheric | −19.2805 | 0.4443 | 1.68 | 19.2 | −23.77 | 93.4376 |
| S10 | Aspheric | 98.1951 | 0.3688 | | | | −99.0000 |
| S11 | Aspheric | −22.2313 | 0.9350 | 1.57 | 37.4 | −71.11 | 16.8161 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S12 | Aspheric | −50.0000 | 0.1324 | | | | −99.0000 |
| S13 | Aspheric | 3.3144 | 0.6615 | 1.54 | 55.7 | 8.40 | −0.8095 |
| S14 | Aspheric | 11.6552 | 0.6397 | | | | 2.6278 |
| S15 | Aspheric | −8.7415 | 0.9060 | 1.54 | 55.7 | −4.78 | −0.3132 |
| S16 | Aspheric | 3.7652 | 0.2155 | | | | −1.1589 |
| S17 | Spherical | Infinite | 0.2100 | 1.52 | 64.2 | | |
| S18 | Spherical | Infinite | 0.4049 | | | | |
| S19 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −1.6285E−02 | −7.3310E−03 | −2.3643E−03 | −6.0373E−04 | −1.2950E−04 | −1.5148E−05 | −3.4272E−06 | 3.8063E−06 | 5.1508E−07 |
| S2 | −6.9609E−02 | 3.5117E−03 | −2.4720E−03 | 3.7424E−04 | 3.7631E−05 | −1.0664E−05 | 5.7913E−06 | −3.0319E−06 | 4.9412E−06 |
| S3 | −7.9825E−02 | 1.9657E−02 | −2.4097E−04 | 5.1095E−04 | 5.8276E−05 | −4.8089E−05 | 4.3197E−06 | −3.0682E−06 | 4.4535E−06 |
| S4 | −6.4711E−03 | 2.3326E−02 | 4.2870E−03 | −3.8016E−04 | −1.4916E−03 | −1.1329E−03 | −4.6777E−04 | −1.3156E−04 | −1.5548E−05 |
| S5 | 2.9919E−02 | 7.2785E−03 | 4.2817E−03 | 1.3455E−03 | 3.2237E−04 | 2.8595E−05 | −2.8416E−05 | −8.8190E−06 | −5.4980E−06 |
| S6 | −2.7398E−03 | 6.9382E−02 | 3.1597E−02 | 5.6966E−03 | 1.8676E−03 | 2.1430E−03 | 1.6151E−03 | 5.0933E−04 | −3.4303E−05 |
| S7 | −1.6878E−01 | −1.8930E−02 | −1.2634E−03 | −5.5746E−04 | −1.3914E−04 | −6.5286E−05 | 1.2338E−05 | −4.6852E−06 | 4.4451E−06 |
| S8 | −2.6613E−01 | −2.4693E−02 | 4.4203E−03 | −5.7729E−04 | −1.7776E−05 | 2.7714E−04 | 2.7678E−04 | 1.5645E−06 | 1.7808E−05 |
| S9 | −4.0220E−01 | −2.0117E−02 | −1.2192E−03 | −3.4730E−04 | 2.0374E−03 | 1.8405E−03 | 5.2680E−04 | 4.2829E−05 | 2.3178E−04 |
| S10 | −5.9458E−01 | 8.7896E−03 | 6.9012E−03 | 4.5449E−03 | 8.7723E−04 | −1.9933E−03 | −1.6312E−03 | −4.4477E−04 | 3.1131E−04 |
| S11 | −6.3169E−01 | −4.1034E−02 | 5.3731E−02 | 1.5828E−02 | 3.8868E−03 | −1.7164E−03 | −2.3400E−03 | −1.3106E−03 | 3.1080E−04 |
| S12 | −1.5315E+00 | 3.5585E−01 | −4.1254E−02 | 9.0681E−03 | −7.0827E−03 | 1.0930E−02 | −9.9109E−03 | −1.2790E−03 | −2.5995E−03 |
| S13 | −5.0343E+00 | 9.7942E−01 | −1.4163E−01 | −1.9464E−03 | −2.0739E−02 | 2.3934E−02 | −1.2522E−02 | −6.3851E−03 | −2.0056E−02 |
| S14 | −2.7293E+00 | 6.3876E−01 | 1.0235E−02 | 1.8800E−02 | −6.5010E−03 | 2.0883E−02 | 8.2173E−03 | 1.8036E−05 | −1.4718E−02 |
| S15 | 6.2053E−01 | 7.8693E−01 | −6.0715E−01 | 2.9652E−01 | −1.3156E−01 | 7.9613E−02 | −2.4519E−02 | 2.5740E−02 | −1.2719E−02 |
| S16 | −5.9894E+00 | 1.2795E+00 | −2.9444E−01 | 1.9750E−01 | −1.1415E−01 | 4.1784E−02 | −2.2476E−02 | 1.9106E−02 | 2.8482E−03 |

Figures 10A, 10B:
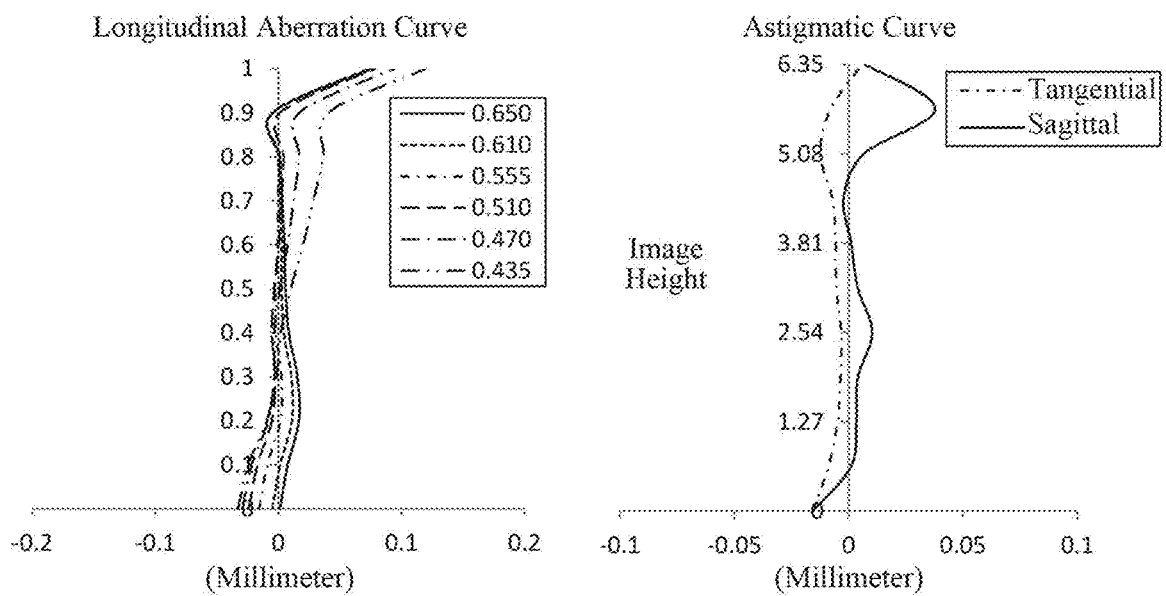

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a concave surface, and an image-side surface S12 thereof is a convex surface. The seventh lens E7 has positive refractive power, an object-side surface S13 thereof is a concave surface, and an image-side surface S14 thereof is a convex surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.70 mm, a total length TTL of the optical imaging lens assembly is 8.30 mm, half of a diagonal length ImgH of an effective pixel area on the imaging plane S19 of the optical imaging lens assembly is 6.28 mm, half of a field-of-view Semi-FOV of the optical imaging lens assembly is 42.700, and a relative F number Fno of the optical imaging lens assembly is 1.70.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

Figure 13:
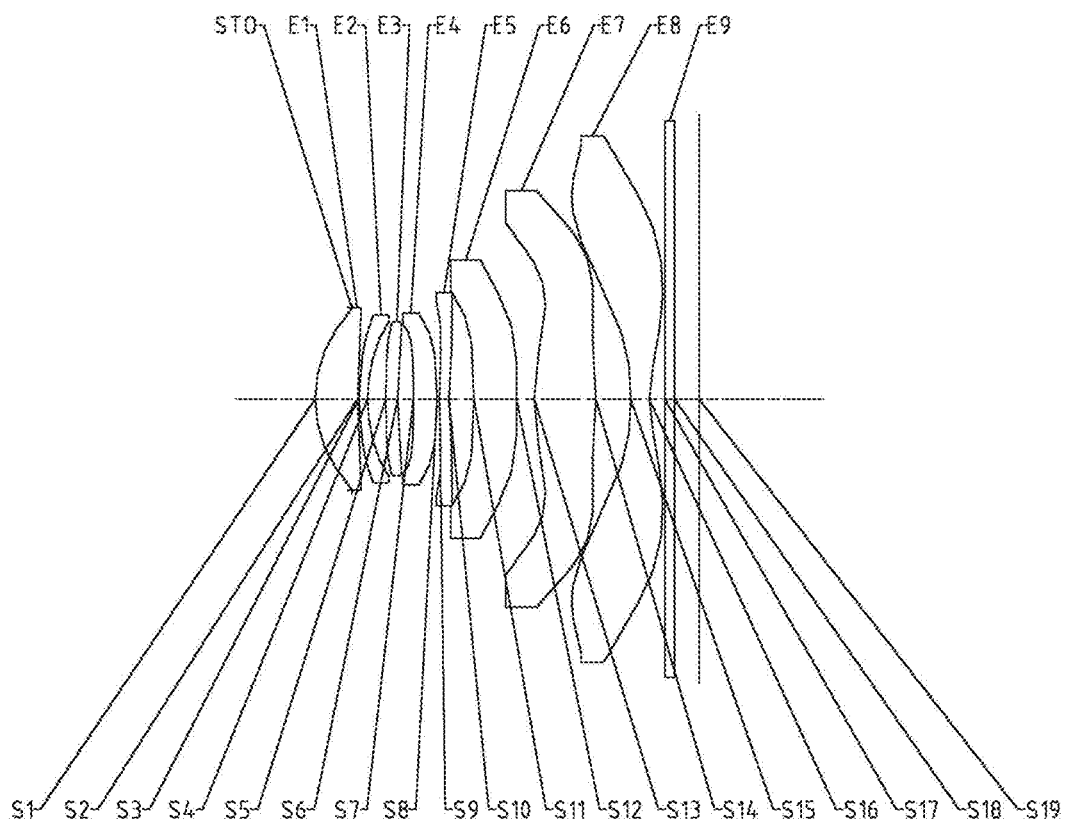
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8095 | | | | |
| S1 | Aspheric | 2.8134 | 0.8975 | 1.55 | 56.1 | 6.17 | 0.0000 |
| S2 | Aspheric | 15.9825 | 0.0200 | | | | 0.0000 |
| S3 | Aspheric | 5.7307 | 0.2072 | 1.68 | 19.2 | −15.92 | 0.0000 |
| S4 | Aspheric | 3.3182 | 0.3944 | | | | 0.0000 |
| S5 | Aspheric | 7.8243 | 0.3392 | 1.55 | 56.1 | 40.98 | 0.0000 |
| S6 | Aspheric | 9.2813 | 0.4872 | | | | 0.0000 |
| S7 | Aspheric | −4.8761 | 0.4981 | 1.55 | 56.1 | 28.66 | 0.0000 |
| S8 | Aspheric | −4.4351 | 0.0258 | | | | 0.0000 |
| S9 | Aspheric | −15.7380 | 0.2002 | 1.68 | 19.2 | −18.89 | 0.0000 |
| S10 | Aspheric | 80.6246 | 0.5019 | | | | 0.0000 |
| S11 | Aspheric | −6.0375 | 1.0084 | 1.57 | 37.4 | 60.18 | 0.0000 |
| S12 | Aspheric | −5.9953 | 0.4316 | | | | 0.0000 |
| S13 | Aspheric | −10.2036 | 1.2594 | 1.54 | 55.7 | 6.45 | 0.0000 |
| S14 | Aspheric | −7.9476 | 0.7266 | | | | 0.0000 |
| S15 | Aspheric | −16.9754 | 0.2687 | 1.54 | 55.7 | −3.74 | 0.0000 |
| S16 | Aspheric | −14.3317 | 0.3138 | | | | 0.0000 |
| S17 | Spherical | Infinite | 0.2100 | 1.52 | 64.2 | | |
| S18 | Spherical | Infinite | 0.5101 | | | | |
| S19 | Spherical | Infinite | | | | | |

TABLE 12

| Surface number | A4 | A6 | A8 | A10 | A1 | A14 | A16 | A18 | A20 |
|---|---|---|---|---|---|---|---|---|---|
| S1 | 3.1527E−02 | −2.0311E−02 | 8.7538E−03 | −2.9204E−03 | 8.0535E−04 | −2.0363E−04 | 5.2409E−05 | −1.1102E−05 | 9.5169E−07 |
| S2 | 2.6242E−02 | −1.4294E−02 | −3.0111E−04 | 6.7214E−03 | −5.5135E−03 | 3.9941E−03 | −2.1939E−03 | 9.3155E−04 | −3.2514E−04 |
| S3 | −4.5526E−02 | 2.8018E−02 | 1.4812E−03 | 7.6459E−04 | 3.9664E−05 | 7.8315E−06 | −9.0826E−05 | −5.0300E−06 | −6.4970E−05 |
| S4 | −1.0273E−01 | 2.2969E−02 | 1.7499E−02 | −1.0354E−02 | 4.4035E−03 | −1.0694E−03 | −7.5770E−05 | 1.4410E−04 | −7.8302E−05 |
| S5 | −1.4265E−01 | 5.4248E−02 | −1.6929E−02 | 3.5617E−03 | −9.4334E−04 | 3.3990E−04 | 1.6829E−04 | 7.0184E−05 | 6.2860E−06 |
| S6 | −8.1185E−01 | 3.8824E−01 | −1.8616E−01 | 9.4627E−02 | 4.8287E−02 | 1.6031E−02 | −3.3352E−04 | −3.4156E−03 | 2.2398E−03 |
| S7 | 2.7869E−01 | −3.3332E−02 | 8.6927E−03 | 4.9095E−03 | 1.3701E−03 | −3.0817E−04 | −2.2991E−05 | 2.6868E−05 | −4.4461E−05 |
| S8 | 1.9142E−01 | 5.8076E−02 | −5.2667E−02 | 2.3530E−02 | −2.0421E−02 | 8.2946E−03 | −3.1464E−03 | 1.4032E−03 | −1.2486E−04 |
| S9 | 4.6249E−01 | −5.9044E−02 | 2.1919E−02 | 1.8955E−02 | −2.3883E−02 | 1.4242E−02 | −9.2441E−03 | 1.0223E−02 | −6.5912E−03 |
| S10 | 2.0703E−01 | 1.2666E−02 | 7.4374E−02 | −2.9376E−02 | 1.7481E−02 | 4.5078E−03 | 5.9730E−03 | −1.9863E−03 | 4.0889E−03 |
| S11 | 2.1369E−01 | 2.8408E−01 | −1.6479E−01 | 4.9752E−02 | 7.5334E−03 | −8.1828E−03 | −7.5660E−03 | 1.3700E−02 | −8.5970E−03 |
| S12 | −8.3579E−02 | 2.2456E−01 | −2.6627E−02 | 5.5774E−02 | 5.5705E−02 | −5.0343E−02 | −7.9985E−03 | 2.5389E−02 | −1.0933E−02 |
| S13 | −4.6753E−01 | 7.0398E−01 | 6.7181E−01 | −1.4771E−01 | −1.8773E−01 | 4.1224E−02 | 7.6862E−02 | −7.6807E−02 | 1.5479E−03 |
| S14 | −5.8561E−01 | 1.2196E+00 | −3.1955E−01 | −7.6264E−02 | −1.9568E−01 | −6.0237E−02 | 1.1762E−01 | −8.9165E−02 | 2.1089E−02 |
| S15 | −1.7972E+00 | −9.5842E−01 | −3.7274E−01 | 5.9472E−01 | −3.2056E−01 | −3.5525E−02 | 6.4227E−02 | −1.4416E−01 | 1.4210E−01 |
| S16 | 6.0247E−01 | 9.7864E−01 | −3.4636E−01 | 8.1495E−01 | −8.8529E−01 | 8.7877E−01 | −4.8952E−01 | 2.1425E−01 | −6.5074E−02 |

Figure 12A:
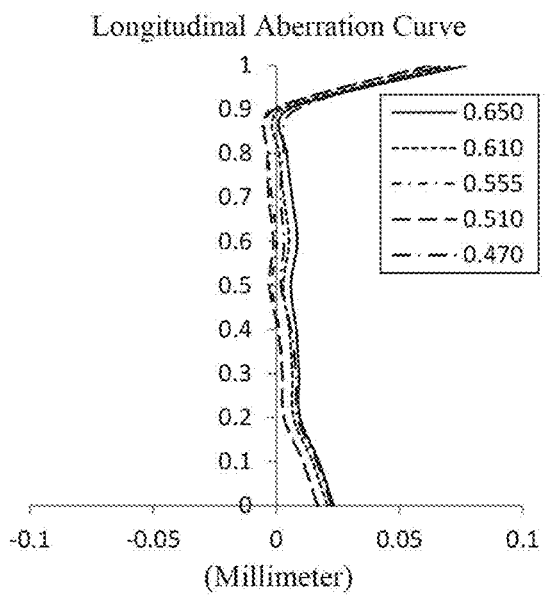
FIGS. 12A to 12D illustrate a longitudinal aberration curve, an astigmatic curve, a distortion curve, and a lateral color curve of the optical imaging lens assembly of the example 6, respectively.
Figure 12B:
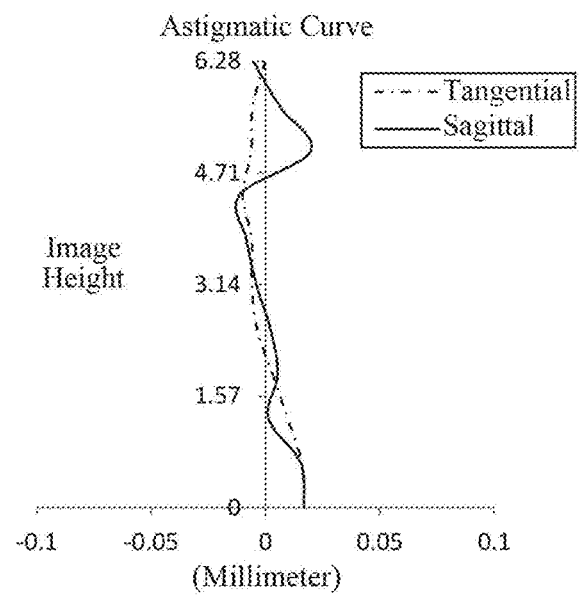
Figure 12C:
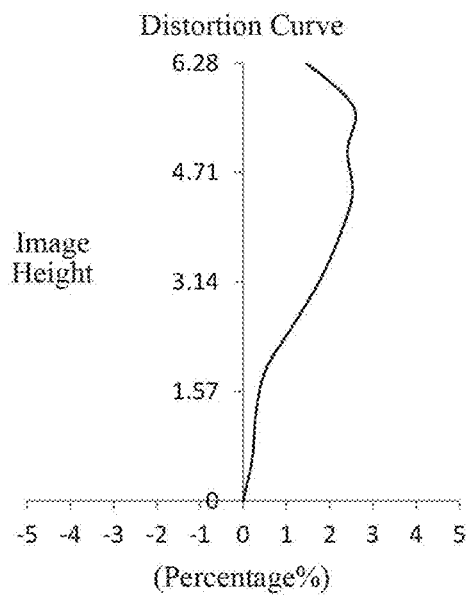
Figure 12D:
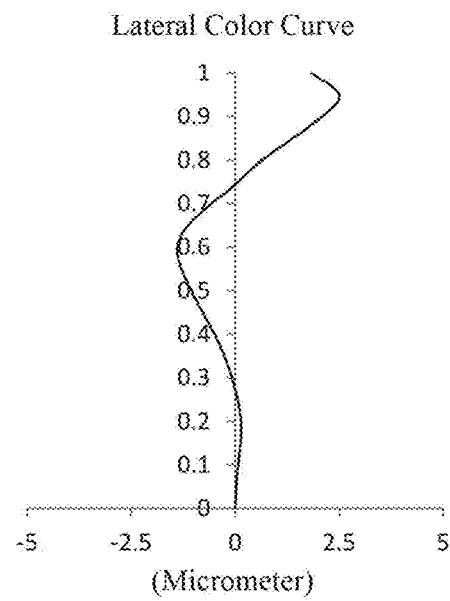

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a convex surface. The seventh lens E7 has positive refractive power, an object-side surface S13 thereof is a concave surface, and an image-side surface S14 thereof is a convex surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.70 mm, a total length TTL of the optical imaging lens assembly is 8.50 mm, half of a diagonal length ImgH of an effective pixel area on the imaging plane S19 of the optical imaging lens assembly is 6.28 mm, half of a field-of-view Semi-FOV of the optical imaging lens assembly is 42.54°, and a relative F number Fno of the optical imaging lens assembly is 1.68.

Table 13 is a table illustrating basic parameters of the optical imaging lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8095 | | | | |
| S1 | Aspheric | 2.8519 | 0.9404 | 1.55 | 56.1 | 6.01 | 0.0000 |
| S2 | Aspheric | 25.8714 | 0.0200 | | | | 0.0000 |
| S3 | Aspheric | 5.6881 | 0.2000 | 1.68 | 19.2 | −17.72 | 0.0000 |
| S4 | Aspheric | 3.3155 | 0.3997 | | | | 0.0000 |
| S5 | Aspheric | 11.6488 | 0.2610 | 1.55 | 56.1 | −71.20 | 0.0000 |
| S6 | Aspheric | 7.6534 | 0.3523 | | | | 0.0000 |
| S7 | Aspheric | −7.4720 | 0.5260 | 1.55 | 56.1 | 18.19 | 0.0000 |
| S8 | Aspheric | −4.6652 | 0.0516 | | | | 0.0000 |
| S9 | Aspheric | −17.7194 | 0.2100 | 1.68 | 19.2 | −27.63 | 0.0000 |
| S10 | Aspheric | 80.2643 | 0.5517 | | | | 0.0000 |
| S11 | Aspheric | −5.1736 | 0.9429 | 1.57 | 37.4 | −22.44 | 0.0000 |
| S12 | Aspheric | −6.3657 | 0.3900 | | | | 0.0000 |
| S13 | Aspheric | −13.0277 | 1.3656 | 1.54 | 55.7 | 5.28 | 0.0000 |
| S14 | Aspheric | −8.7464 | 0.7703 | | | | 0.0000 |
| S15 | Aspheric | −19.6641 | 0.4166 | 1.54 | 55.7 | −4.20 | 0.0000 |
| S16 | Aspheric | −14.9722 | 0.3478 | | | | 0.0000 |
| S17 | Spherical | Infinite | 0.2100 | 1.52 | 64.2 | | |
| S18 | Spherical | Infinite | 0.5440 | | | | |
| S19 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 3.1223E−02 | −1.8137E−02 | 7.2921E−03 | −2.3868E−03 | 7.4746E−04 | −2.3248E−04 | 8.8056E−05 | −2.0123E−05 | 9.5006E−06 |
| S2 | 3.2989E−02 | −1.2871E−02 | 4.0503E−04 | 6.8669E−03 | −4.9863E−03 | 4.0703E−03 | −1.9238E−03 | 8.9098E−04 | −1.9657E−04 |
| S3 | −4.9866E−02 | 2.3798E−02 | 2.8358E−03 | 8.3606E−04 | 1.0069E−05 | 3.4377E−04 | −2.0272E−04 | 1.2560E−04 | −7.0589E−05 |
| S4 | −1.0649E−01 | 1.8735E−02 | 1.5134E−02 | −9.3433E−03 | 4.1166E−03 | −1.0632E−03 | −1.9471E−04 | 2.5368E−04 | −1.2865E−04 |
| S5 | −1.4100E−01 | 5.4963E−02 | −1.9860E−02 | 6.1419E−03 | −2.0459E−03 | 6.0801E−04 | −1.9301E−04 | 4.0514E−05 | 2.3586E−05 |
| S6 | −7.9677E−01 | 3.8607E−01 | −1.9059E−01 | 9.5020E−02 | −4.6071E−02 | 1.6582E−02 | −1.9329E−03 | −2.8277E−03 | 2.2156E−03 |
| S7 | 2.7201E−01 | −4.5948E−02 | 1.2188E−02 | 4.4527E−03 | 1.4045E−03 | −3.4507E−04 | 8.0253E−05 | 1.2852E−05 | 1.3977E−05 |
| S8 | 1.8590E−01 | 5.0598E−02 | −5.1561E−02 | 3.0078E−02 | −2.0579E−02 | 9.1992E−03 | −4.0243E−03 | 1.4425E−03 | −2.3393E−04 |
| S9 | 4.5753E−01 | −6.2481E−02 | 2.4121E−02 | 2.2276E−02 | −2.6125E−02 | 1.1474E−02 | −9.9911E−03 | 8.5087E−03 | −7.0473E−03 |
| S10 | 2.2566E−01 | 5.7646E−03 | 6.1624E−02 | −3.0944E−02 | 1.7074E−02 | −1.0437E−02 | 4.8053E−03 | −2.7012E−03 | 3.0789E−03 |
| S11 | 1.5936E−01 | 2.8247E−01 | −1.4829E−01 | 5.8235E−02 | 4.6444E−03 | −8.4583E−03 | −5.1905E−03 | 1.2732E−02 | −8.2942E−03 |
| S12 | −1.3343E−01 | 2.3597E−01 | 4.4268E−02 | 1.0166E−01 | 5.3264E−02 | −5.8200E−02 | −5.3104E−04 | 2.6363E−02 | −1.0757E−02 |
| S13 | −6.4081E−02 | 8.1383E−01 | 6.5610E−01 | −1.9583E−01 | −1.8617E−01 | 6.4668E−02 | 9.1446E−02 | −8.4600E−02 | 3.3600E−03 |
| S14 | −3.1412E−01 | 1.2023E+00 | −3.7485E−01 | −1.0327E−01 | −2.1141E−01 | −5.4935E−02 | 1.0118E−01 | −8.2465E−02 | 1.8818E−02 |
| S15 | −1.8252E+00 | −9.5048E−01 | −2.4498E−01 | 6.5834E−01 | −2.4739E−01 | 6.8821E−02 | 1.1836E−01 | −1.0123E−01 | 1.5323E−01 |
| S16 | 5.4768E−01 | 1.0825E+00 | −1.5464E−01 | 7.8444E−01 | −8.0032E−01 | 9.1571E−01 | −5.2067E−01 | 2.6666E−01 | −4.4881E−02 |

Figures 14A, 14B:
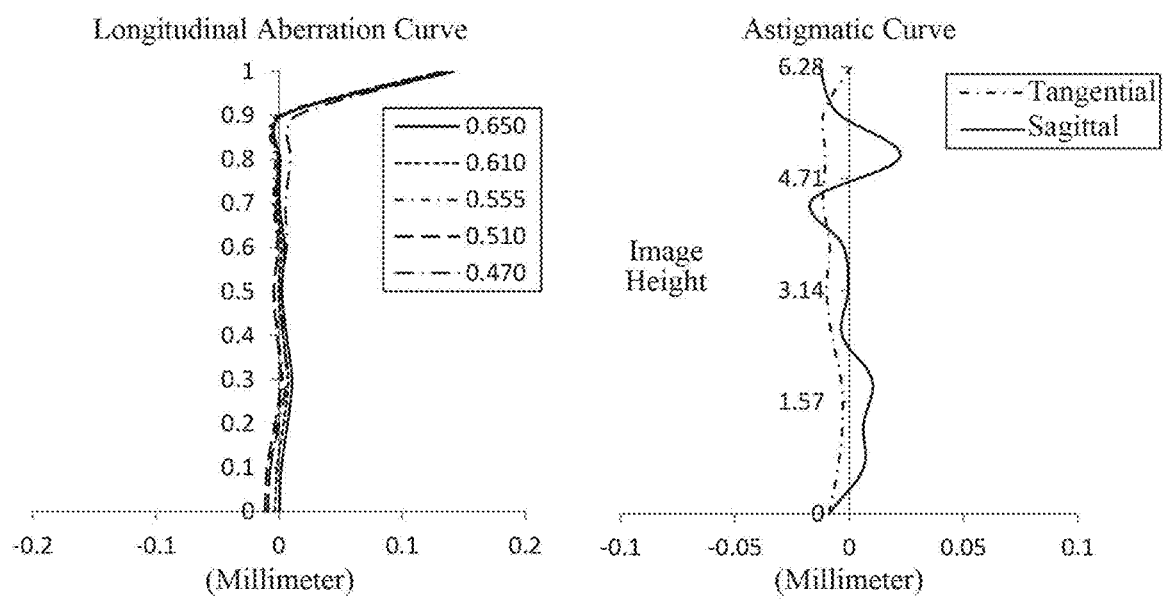
FIGS. 14A to 14D illustrate a longitudinal aberration curve, an astigmatic curve, a distortion curve, and a lateral color curve of the optical imaging lens assembly of the example 7, respectively.
Figure 14C:
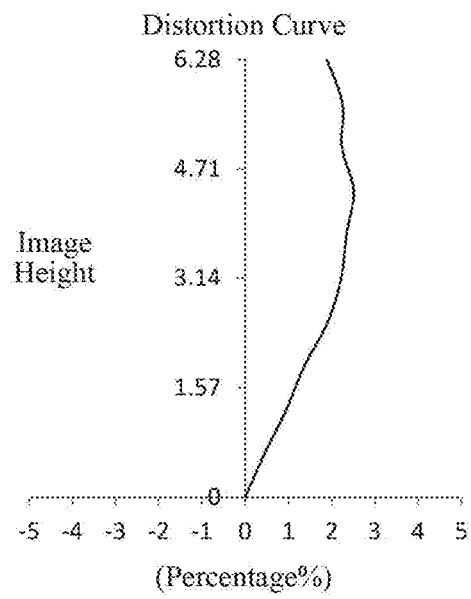
Figure 14D:
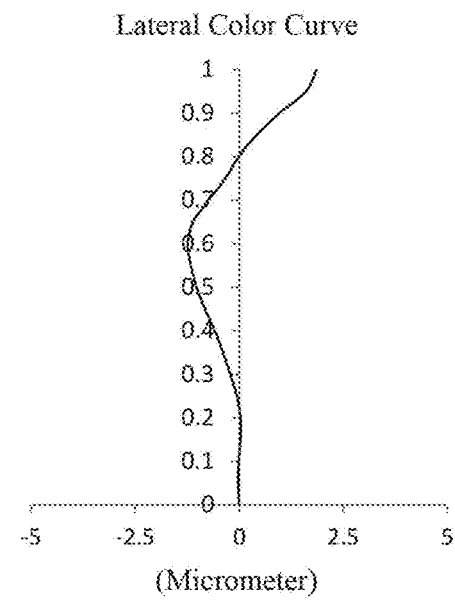

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

Example 8

Figure 15:
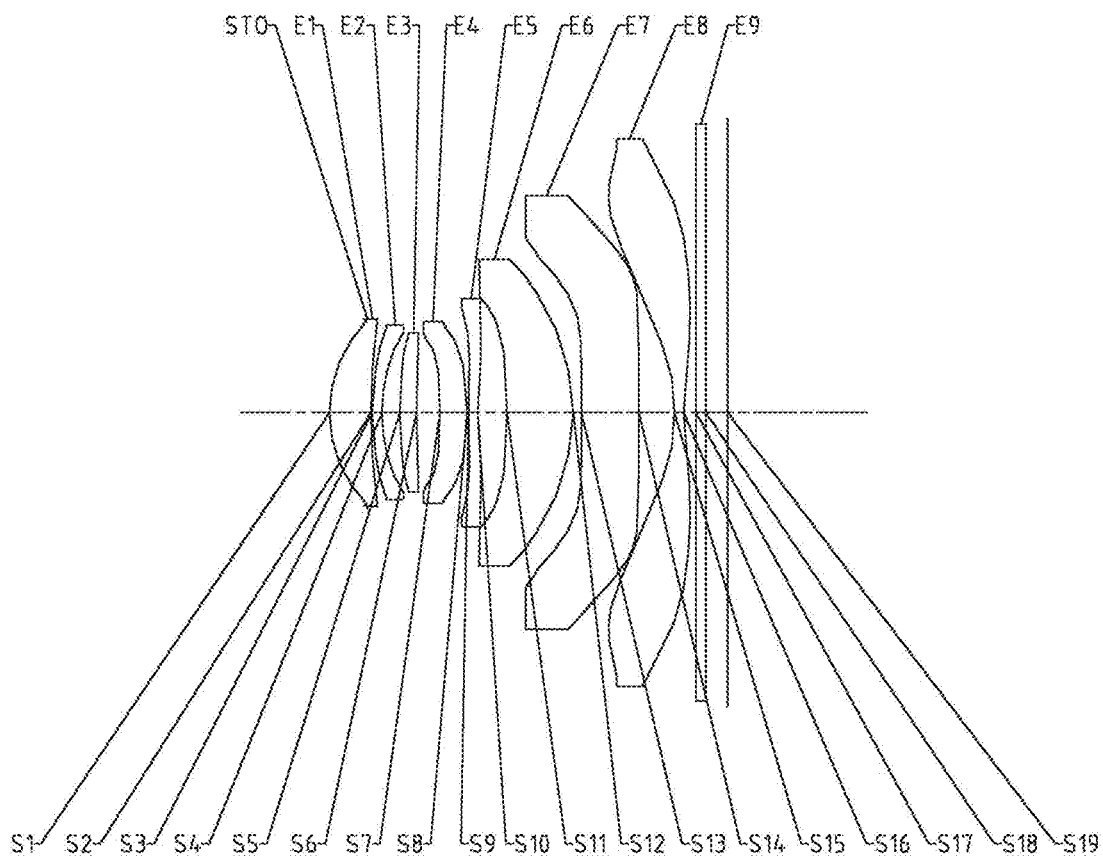
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a convex surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.70 mm, a total length TTL of the optical imaging lens assembly is 8.50 mm, half of a diagonal length ImgH of an effective pixel area on the imaging plane S19 of the optical imaging lens assembly is 6.28 mm, half of a field-of-view Semi-FOV of the optical imaging lens assembly is 42.59°, and a relative F number Fno of the optical imaging lens assembly is 1.70.

Table 15 is a table illustrating basic parameters of the optical imaging lens assembly of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8095 | | | | |
| S1 | Aspheric | 2.8211 | 0.8899 | 1.55 | 56.1 | 6.30 | 0.0000 |
| S2 | Aspheric | 15.1948 | 0.0200 | | | | 0.0000 |
| S3 | Aspheric | 5.7742 | 0.2102 | 1.68 | 19.2 | −16.62 | 0.0000 |
| S4 | Aspheric | 3.3688 | 0.3857 | | | | 0.0000 |
| S5 | Aspheric | 8.1064 | 0.3544 | 1.55 | 56.1 | 36.43 | 0.0000 |
| S6 | Aspheric | 9.8548 | 0.4967 | | | | 0.0000 |
| S7 | Aspheric | −4.6766 | 0.5884 | 1.55 | 56.1 | 16.67 | 0.0000 |
| S8 | Aspheric | −3.7967 | 0.0200 | | | | 0.0000 |
| S9 | Aspheric | −13.6137 | 0.2000 | 1.68 | 19.2 | −16.44 | 0.0000 |
| S10 | Aspheric | 80.3764 | 0.6250 | | | | 0.0000 |
| S11 | Aspheric | −4.9693 | 1.4148 | 1.57 | 37.4 | 8.24 | 0.0000 |
| S12 | Aspheric | −4.8207 | 0.1760 | | | | 0.0000 |
| S13 | Aspheric | −8.1017 | 1.2234 | 1.54 | 55.7 | −60.51 | 0.0000 |
| S14 | Aspheric | −8.1789 | 0.7578 | | | | 0.0000 |
| S15 | Aspheric | −17.4420 | 0.2000 | 1.54 | 55.7 | −5.17 | 0.0000 |
| S16 | Aspheric | −17.4500 | 0.2657 | | | | 0.0000 |
| S17 | Spherical | Infinite | 0.2100 | 1.52 | 64.2 | | |
| S18 | Spherical | Infinite | 0.4619 | | | | |
| S19 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 2.8920E-02 | -2.0646E-02 | 9.3972E-03 | -3.3403E-03 | 9.8674E-04 | -2.3466E-04 | 3.9774E-05 | 1.2935E-05 | 1.3694E-06 |
| S2 | 2.8117E-02 | -1.5108E-02 | -1.1483E-03 | 7.7511E-03 | -5.7359E-03 | 3.7668E-03 | -1.7935E-03 | 7.3375E-04 | -2.2922E-04 |
| S3 | -4.3329E-02 | 2.7105E-02 | 1.6068E-03 | 1.3574E-03 | -3.1522E-04 | 1.9006E-04 | -6.5479E-05 | -7.1224E-06 | -4.1652E-05 |
| S4 | -1.0406E-01 | 2.3795E-02 | 1.7789E-02 | -1.0816E-02 | 4.6784E-03 | -1.2474E-03 | 5.6655E-05 | 8.7646E-05 | -6.2936E-05 |
| S5 | -1.3865E-01 | 5.6486E-02 | -1.7401E-02 | 3.0630E-03 | -5.2933E-04 | 1.6718E-04 | -7.4352E-05 | 9.8106E-06 | 4.8202E-05 |
| S6 | -8.1203E-01 | 3.9043E-01 | -1.8402E-01 | 9.3855E-02 | -4.9844E-02 | 1.6547E-02 | 6.0677E-04 | -4.2523E-03 | 2.4793E-03 |
| S7 | 2.8023E-01 | -3.3961E-02 | 8.0212E-03 | -4.4812E-03 | 1.5066E-03 | -3.5682E-04 | 6.1483E-06 | 2.6679E-05 | -2.5968E-05 |
| S8 | 1.5973E-01 | 5.3303E-02 | -5.2230E-02 | 2.4739E-02 | -1.8916E-02 | 9.7371E-03 | -3.5229E-03 | 1.4836E-03 | -1.9429E-04 |
| S9 | 4.5998E-01 | -6.1167E-02 | 2.5488E-02 | 2.4515E-02 | -2.2118E-02 | 1.4761E-02 | -8.0151E-03 | 9.3538E-03 | -6.5524E-03 |
| S10 | 1.9964E-01 | 2.6455E-02 | 7.7862E-02 | -2.6573E-02 | 2.0343E-02 | -6.1148E-03 | 7.7433E-03 | -2.8534E-03 | 3.9298E-03 |
| S11 | 2.3729E-01 | 2.8493E-01 | -1.8024E-01 | 3.8330E-02 | 7.1222E-03 | -6.7493E-03 | -9.5313E-03 | 1.5763E-02 | -9.5980E-03 |
| S12 | -3.0239E-01 | 1.2817E-01 | -9.0415E-02 | 1.5406E-02 | 2.5465E-02 | -6.5653E-02 | -1.0661E-02 | 3.5445E-02 | -1.3322E-02 |
| S13 | -9.1273E-01 | 5.0459E-01 | 5.8501E-01 | -1.3451E-01 | -1.9835E-01 | 4.7378E-03 | 4.4495E-02 | -6.5420E-02 | 6.3217E-03 |
| S14 | -5.1474E-01 | 1.2652E+00 | -1.7034E-01 | -5.0052E-02 | -2.2805E-01 | 1.7448E-02 | 1.8305E-01 | -1.4120E-01 | 4.1311E-02 |
| S15 | -1.8478E+00 | -9.1418E-01 | -3.1965E-01 | 5.9846E-01 | 4.1076E-01 | -4.0066E-02 | 1.8654E-01 | -1.1326E-01 | 2.2596E-01 |
| S16 | 4.3812E-01 | 8.1150E-01 | -3.8981E-01 | 5.8903E-01 | -6.1910E-01 | 8.6940E-01 | -6.1628E-01 | 3.5726E-01 | -1.2277E-01 |

Figure 16A:
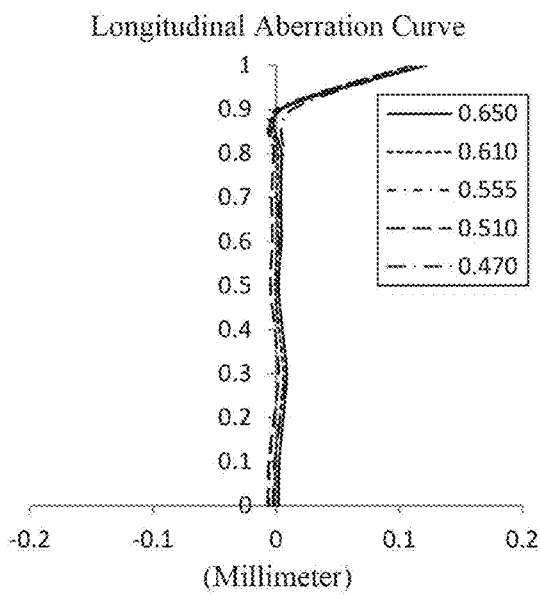
FIGS. 16A to 16D illustrate a longitudinal aberration curve, an astigmatic curve, a distortion curve, and a lateral color curve of the optical imaging lens assembly of the example 8, respectively.
Figure 16B:
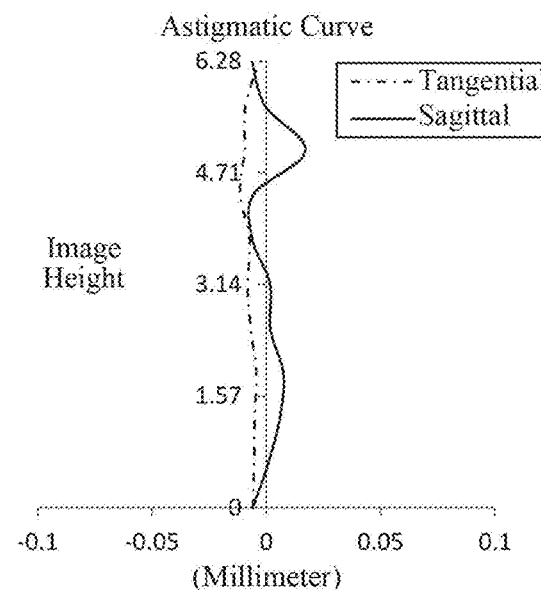
Figure 16C:
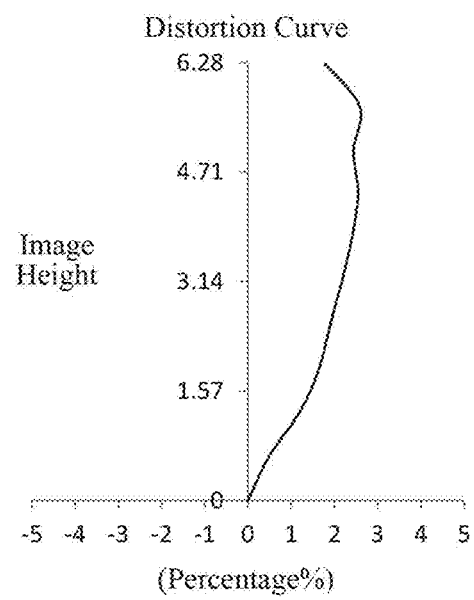
Figure 16D:
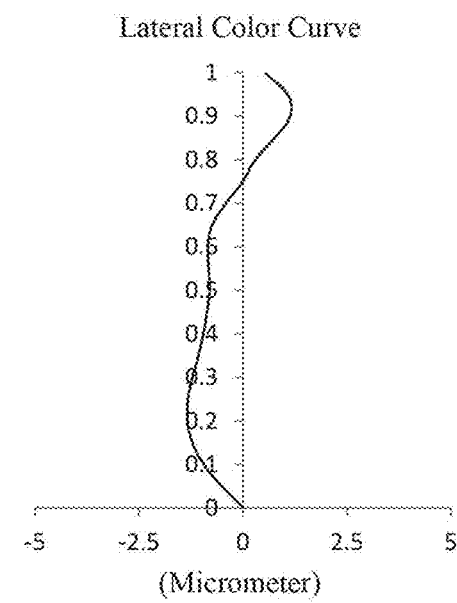

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. FIG. 16D illustrates a lateral color curve of the optical imaging lens assembly according to example 8, representing deviations of different image heights on an imaging plane after light passes through the lens assembly. It can be seen from FIG. 16A to FIG. 16D that the optical imaging lens assembly provided in example 8 may achieve good image quality.

Example 9

Figure 17:
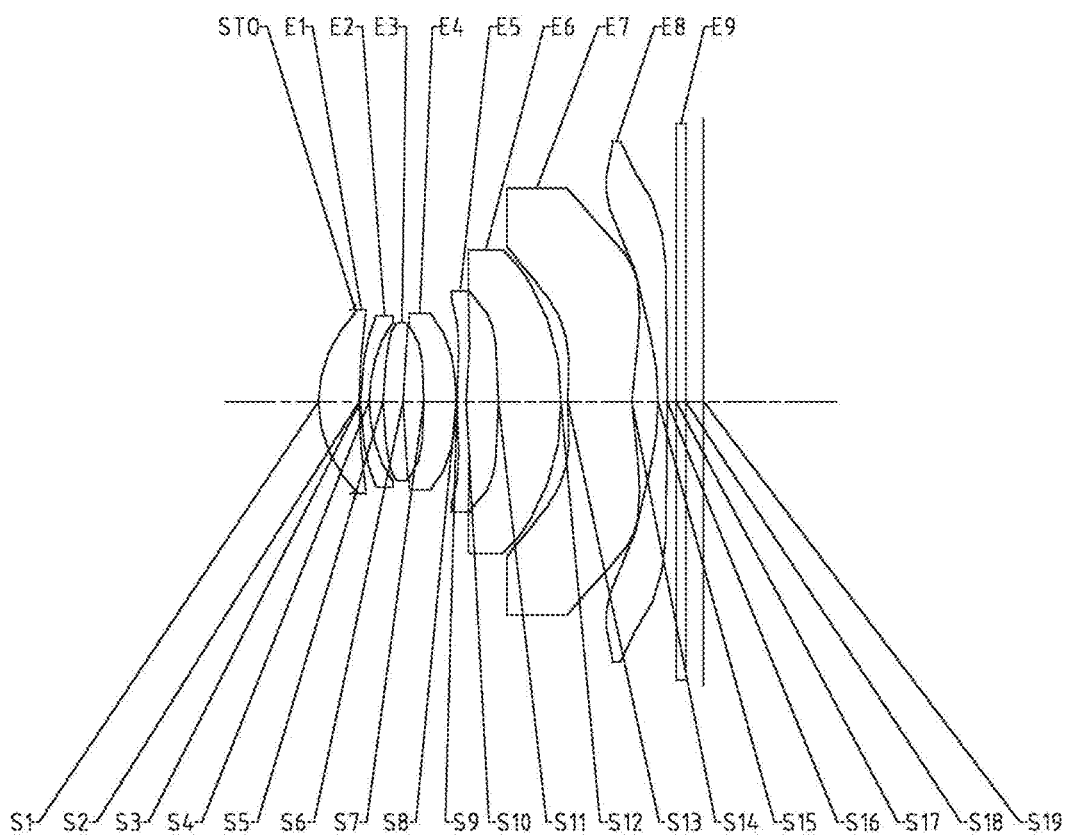
FIG. 17 illustrates a schematic structural view of an optical imaging lens assembly according to example 9 of the present disclosure.

An optical imaging lens assembly according to example 9 of the present disclosure is described below with reference to FIG. 17 to FIG. 18D. FIG. 17 shows a schematic structural view of the optical imaging lens assembly according to example 9 of the present disclosure.

As shown in FIG. 17, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S1i thereof is a concave surface, and an image-side surface S12 thereof is a convex surface. The seventh lens E7 has negative refractive power, an object-side surface S13 thereof is a concave surface, and an image-side surface S14 thereof is a convex surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S519.

In this example, a total effective focal length f of the optical imaging lens assembly is 6.82 mm, a total length TTL of the optical imaging lens assembly is 8.50 mm, half of a diagonal length ImgH of an effective pixel area on the imaging plane 19 of the optical imaging lens assembly is 6.28 mm, half of a field-of-view Semi-FOV of the optical imaging lens assembly is 41.920, and a relative F number Fno of the optical imaging lens assembly is 1.70.

Table 17 is a table illustrating basic parameters of the optical imaging lens assembly of example 9, wherein the units for the radius of curvature, the thickness/distance and the focal length are millimeter (mm). Table 18 shows high-order coefficients applicable to each aspheric surface in example 9, wherein the surface shape of each aspheric surface may be defined by the formula (1) given in the above example 1.

TABLE 17

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | -0.8095 | | | | |
| S1 | Aspheric | 2.8124 | 0.8978 | 1.55 | 56.1 | 6.28 | 0.0000 |

TABLE 17-continued

| Surface number | Surface type | Radius of curvature | Thickness/ Distance | Material Refractive index | Abbe number | Focal length | Conic coefficient |
|---|---|---|---|---|---|---|---|
| S2 | Aspheric | 14.1222 | 0.0200 | | | | 0.0000 |
| S3 | Aspheric | 5.3764 | 0.2000 | 1.68 | 19.2 | −14.99 | 0.0000 |
| S4 | Aspheric | 3.2158 | 0.3087 | | | | 0.0000 |
| S5 | Aspheric | 6.0958 | 0.4415 | 1.55 | 56.1 | 31.95 | 0.0000 |
| S6 | Aspheric | 6.8591 | 0.4532 | | | | 0.0000 |
| S7 | Aspheric | −5.0787 | 0.7163 | 1.55 | 56.1 | 16.94 | 0.0000 |
| S8 | Aspheric | −3.6485 | 0.0200 | | | | 0.0000 |
| S9 | Aspheric | −16.1708 | 0.2010 | 1.68 | 19.2 | −32.05 | 0.0000 |
| S10 | Aspheric | 80.0835 | 0.7143 | | | | 0.0000 |
| S11 | Aspheric | −4.7311 | 1.3770 | 1.57 | 37.4 | −62.21 | 0.0000 |
| S12 | Aspheric | −5.1155 | 0.1521 | | | | 0.0000 |
| S13 | Aspheric | −7.0967 | 1.4157 | 1.54 | 55.7 | −61.80 | 0.0000 |
| S14 | Aspheric | −8.4970 | 0.5798 | | | | 0.0000 |
| S15 | Aspheric | −23.1321 | 0.2000 | 1.54 | 55.7 | −18.30 | 0.0000 |
| S16 | Aspheric | −16.1711 | 0.1983 | | | | 0.0000 |
| S17 | Spherical | Infinite | 0.2100 | 1.52 | 64.2 | | |
| S18 | Spherical | Infinite | 0.3945 | | | | |
| S19 | Spherical | Infinite | | | | | |

TABLE 18

| Surface number | A4 | A6 | A8 | A10 | A12 | A14 | A16 | A18 | A20 |
|---|---|---|---|---|---|---|---|---|---|
| S1 | 3.7154E−02 | −1.8915E−02 | 7.1732E−03 | −2.0768E−03 | 5.0144E−04 | −1.2644E−04 | 5.7974E−05 | 9.7377E−06 | 2.1670E−05 |
| S2 | 3.9246E−02 | −1.2614E−02 | −1.3947E−03 | 6.2292E−03 | −5.9778E−03 | 3.8548E−03 | −2.1704E−03 | 6.7085E−04 | −2.5830E−04 |
| S3 | −4.0425E−02 | 2.7048E−02 | 3.5435E−03 | −4.6554E−04 | −1.3045E−04 | 1.4511E−04 | −1.8226E−04 | −1.3418E−04 | 6.1411E−05 |
| S4 | −1.0161E−01 | 2.7129E−02 | 1.8637E−02 | −1.1787E−02 | 4.6951E−03 | −8.4967E−04 | −1.8435E−06 | −1.0211E−04 | 8.7449E−05 |
| S5 | −1.3290E−01 | 6.1225E−02 | −1.9255E−02 | 3.4559E−03 | −4.1679E−04 | 2.3102E−04 | −2.5759E−04 | 2.1236E−04 | −5.6931E−05 |
| S6 | −8.1282E−01 | 3.9152E−01 | −1.8299E−01 | 9.3868E−02 | −5.0498E−02 | 1.6744E−02 | 1.1828E−03 | −4.6946E−03 | 2.5563E−03 |
| S7 | 2.7568E−01 | −3.7967E−02 | 1.0150E−02 | −4.8357E−03 | 1.9060E−03 | −6.2103E−04 | 1.5009E−04 | −1.4626E−05 | 2.3051E−05 |
| S8 | 1.5137E−01 | 5.5751E−02 | −4.6022E−02 | 2.7910E−02 | −1.7846E−02 | 9.1982E−03 | −4.2239E−03 | 1.7440E−03 | −3.6238E−04 |
| S9 | 4.7549E−01 | −5.7229E−02 | 2.7714E−02 | 2.6680E−02 | −2.4031E−02 | 1.3769E−02 | −8.8617E−03 | 7.4497E−03 | −6.4044E−03 |
| S10 | 1.8736E−01 | 2.7319E−02 | 7.8606E−02 | −3.0606E−02 | 1.3958E−02 | −7.4536E−03 | 6.8887E−03 | −5.3173E−03 | 3.9079E−03 |
| S11 | 2.7388E−01 | 2.9125E−01 | −1.9348E−01 | 3.0988E−02 | 1.2818E−02 | −4.3045E−03 | −1.2150E−02 | 1.7103E−02 | −1.0617E−02 |
| S12 | −4.0434E−02 | 1.5435E−01 | −8.5022E−02 | 4.8858E−02 | 5.8172E−02 | −4.3486E−02 | 1.7064E−02 | 4.7119E−02 | 7.0468E−04 |
| S13 | −1.5963E+00 | 3.9471E−01 | 6.0256E−01 | −1.0086E−02 | −4.4007E−02 | 6.3249E−02 | 6.1328E−02 | −4.8731E−02 | 5.9903E−02 |
| S14 | −3.0757E−01 | 1.3374E+00 | 1.4100E−01 | 1.3948E−01 | −2.7952E−01 | 3.2090E−02 | 3.0033E−01 | −8.7782E−02 | 2.4540E−02 |
| S15 | −1.6691E+00 | −5.5442E−01 | −2.4417E−03 | 7.3411E−01 | −5.0687E−01 | −1.1854E−01 | 9.0124E−02 | −2.1575E−01 | 2.0229E−01 |
| S16 | −2.0941E−01 | 1.0377E+00 | −5.4451E−01 | 2.7139E−01 | −5.0016E−01 | 6.5182E−01 | −6.2708E−01 | 2.8399E−01 | −1.5927E−01 |

Figures 18A, 18B:
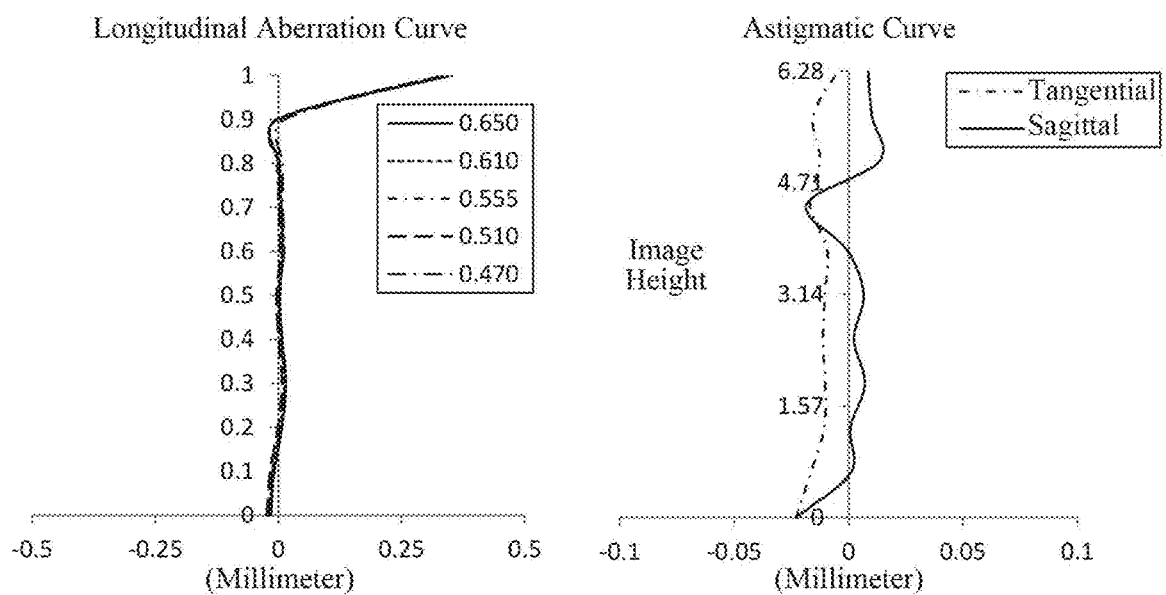
FIGS. 18A to 18D illustrate a longitudinal aberration curve, an astigmatic curve, a distortion curve, and a lateral color curve of the optical imaging lens assembly of the example 9, respectively.
Figure 18C:
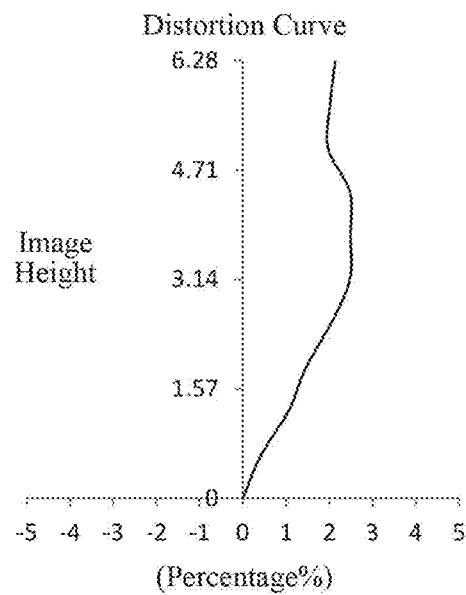
Figure 18D:
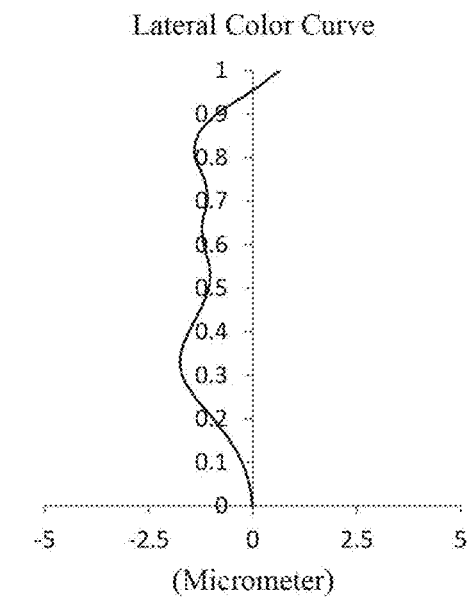

FIG. 18A illustrates a longitudinal aberration curve of the optical imaging lens assembly according to example 9, representing deviations of focal points converged by light of different wavelengths after passing through the lens assembly. FIG. 18B illustrates an astigmatic curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion corresponding to different image heights. FIG. 18D illustrates a lateral color curve of the optical imaging lens assembly according to example 9, representing deviations of different image heights on an imaging plane after light passes through the lens assembly. It can be seen from FIG. 18A to FIG. 18D that the optical imaging lens assembly provided in example 9 may achieve good image quality.

Example 10

Figure 19:
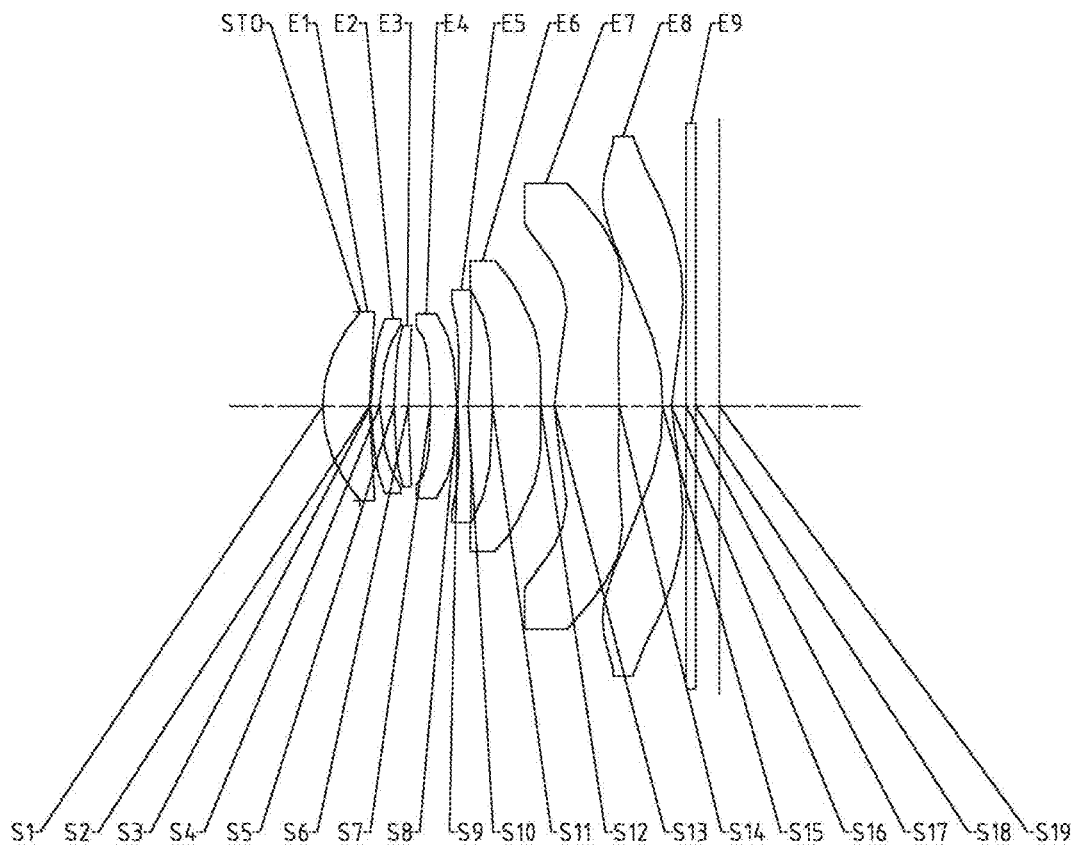
FIG. 19 illustrates a schematic structural view of an optical imaging lens assembly according to example 10 of the present disclosure.

An optical imaging lens assembly according to example 10 of the present disclosure is described below with reference to FIG. 19 to FIG. 20D. FIG. 19 shows a schematic structural view of the optical imaging lens assembly according to example 10 of the present disclosure.

As shown in FIG. 19, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a convex surface. The seventh lens E7 has positive refractive power, an object-side surface S13 thereof is a concave surface, and an image-side surface S14 thereof is a convex surface. The eighth lens E8 has negative refractive power, an object-side surface S15 thereof is a concave surface, and an image-side surface S16 thereof is a convex surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly is 6.74 mm, a total length TTL of the optical imaging lens assembly is 8.70 mm, half of a diagonal length ImgH of an effective pixel area on the imaging plane S19 of the optical imaging lens assembly is 6.28 mm, half of a field-of-view Semi-FOV of the optical imaging lens assembly is 42.84°, and a relative F number Fno of the optical imaging lens assembly is 1.65.

Table 19 is a table illustrating basic parameters of the optical imaging lens assembly of example 10, wherein the units for the radius of curvature, the thickness/distance and the focal length are millimeter (mm). Table 20 shows high-order coefficients applicable to each aspheric surface in example 10, wherein the surface shape of each aspheric surface may be defined by the formula (1) given in the above example 1.

TABLE 19

| Surface number | surface type | radius of curvature | Thickness/ Distance | Material refractive index | Abbe number | Focal length | conic coefficient |
|---|---|---|---|---|---|---|---|
| OBJ | Spherical | Infinite | Infinite | | | | |
| STO | Spherical | Infinite | −0.8095 | | | | |
| S1 | Aspheric | 2.9640 | 1.0292 | 1.55 | 56.1 | 10.65 | 0.0000 |
| S2 | Aspheric | 18.9971 | 0.0200 | | | | 0.0000 |
| S3 | Aspheric | 6.2028 | 0.2000 | 1.68 | 19.2 | 62.07 | 0.0000 |
| S4 | Aspheric | 3.6459 | 0.3176 | | | | 0.0000 |
| S5 | Aspheric | 9.0275 | 0.3094 | 1.55 | 56.1 | 84.29 | 0.0000 |
| S6 | Aspheric | 9.0633 | 0.4896 | | | | 0.0000 |
| S7 | Aspheric | −5.8174 | 0.5815 | 1.55 | 56.1 | 17.92 | 0.0000 |
| S8 | Aspheric | −4.6860 | 0.0200 | | | | 0.0000 |
| S9 | Aspheric | −15.0799 | 0.2259 | 1.68 | 19.2 | −18.02 | 0.0000 |
| S10 | Aspheric | 80.3798 | 0.5296 | | | | 0.0000 |
| S11 | Aspheric | −6.2464 | 1.0616 | 1.57 | 37.4 | −21.19 | 0.0000 |
| S12 | Aspheric | −5.4471 | 0.2977 | | | | 0.0000 |
| S13 | Aspheric | −13.0843 | 1.4177 | 1.54 | 55.7 | 5.52 | 0.0000 |
| S14 | Aspheric | −10.5201 | 0.9497 | | | | 0.0000 |
| S15 | Aspheric | −21.8497 | 0.2000 | 1.54 | 55.7 | −4.57 | 0.0000 |
| S16 | Aspheric | −19.3127 | 0.3221 | | | | 0.0000 |
| S17 | Spherical | Infinite | 0.2100 | 1.52 | 64.2 | | |
| S18 | Spherical | Infinite | 0.5183 | | | | |
| S19 | Spherical | Infinite | | | | | |

TABLE 20

| Surface number | A4 | A6 | A8 | A10 | A12 | A14 | A16 | A18 | A20 |
|---|---|---|---|---|---|---|---|---|---|
| S1 | 3.3413E−02 | −1.6318E−02 | 5.6768E−03 | −1.4045E−03 | 2.3748E−04 | −1.8448E−05 | −1.3336E−05 | 1.2876E−05 | 2.7646E−06 |
| S2 | 5.8522E−02 | 4.5277E−03 | 1.0370E−02 | 1.3418E−02 | 3.8146E−03 | 3.6184E−03 | 1.9673E−03 | 3.1297E−04 | 5.8971E−04 |
| S3 | −3.6975E−02 | 3.4375E−02 | 1.1662E−02 | 5.2631E−03 | 3.1746E−03 | 1.2139E−03 | 3.8654E−04 | 1.2759E−04 | −1.0021E−05 |
| S4 | −1.1323E−01 | 2.5063E−02 | 1.4616E−02 | −1.2885E−02 | 7.5591E−03 | −3.2535E−03 | 7.6303E−04 | −2.8074E−04 | −6.5663E−05 |
| S5 | −1.1631E−01 | 6.1384E−02 | −2.5838E−02 | 4.4268E−03 | −2.3799E−04 | −2.4823E−04 | 1.0178E−04 | −3.8836E−05 | 4.4030E−05 |
| S6 | −7.8228E−01 | 4.0091E−01 | −1.8416E−01 | 8.7585E−02 | −5.2260E−02 | 1.9963E−02 | −7.1118E−04 | −4.0420E−03 | 2.4678E−03 |
| S7 | 2.5596E−01 | −4.1366E−02 | 8.7097E−03 | −4.1721E−03 | 1.7001E−03 | 4.8784E−04 | 1.0407E−04 | 3.4044E−05 | −2.9121E−05 |
| S8 | 1.3816E−01 | 4.7470E−02 | −5.2796E−02 | 2.4295E−02 | −2.1310E−02 | 1.0350E−02 | 4.0794E−03 | 1.5128E−03 | −1.9305E−04 |
| S9 | 4.2367E−01 | −6.4295E−02 | 3.6859E−02 | 2.3615E−02 | −3.2153E−02 | 1.0519E−02 | −5.0590E−03 | 7.6354E−03 | −6.5515E−03 |
| S10 | 1.8216E−01 | −6.1830E−03 | 8.5852E−02 | −1.0597E−02 | −2.5741E−03 | −5.5896E−03 | 1.0360E−02 | −4.5312E−03 | 3.9552E−03 |
| S11 | 8.8560E−02 | 2.7034E−01 | −1.2348E−01 | 5.7177E−02 | −2.1711E−02 | −7.6657E−04 | 5.0198E−03 | 3.7386E−03 | −5.5182E−03 |
| S12 | 1.0101E−01 | 2.4555E−01 | 3.3370E−05 | 8.7060E−02 | 3.5758E−02 | −5.7262E−02 | 3.0025E−02 | 7.3336E−03 | −8.2407E−03 |
| S13 | −8.2660E−02 | 7.8618E−01 | 7.2219E−01 | −1.1427E−01 | −1.7692E−01 | 5.7464E−02 | 8.3611E−02 | −9.0478E−02 | 1.7506E−02 |
| S14 | 2.3018E−01 | 1.1959E+00 | −4.2805E−01 | −4.3376E−02 | −1.7185E−01 | −9.9404E−02 | 1.2441E−01 | −8.3581E−02 | 3.4501E−03 |
| S15 | −2.0991E+00 | −8.5979E−01 | −8.7576E−02 | 5.5870E−01 | −3.7179E−01 | 1.3688E−01 | 1.5513E−02 | −1.9794E−02 | 1.5338E−01 |
| S16 | −1.0387E−01 | 1.1314E+00 | −2.2073E−01 | 7.3246E−01 | −6.8907E−01 | 8.1568E−01 | −5.5584E−01 | 3.4050E−01 | −7.2381E−02 |

Figure 20A:
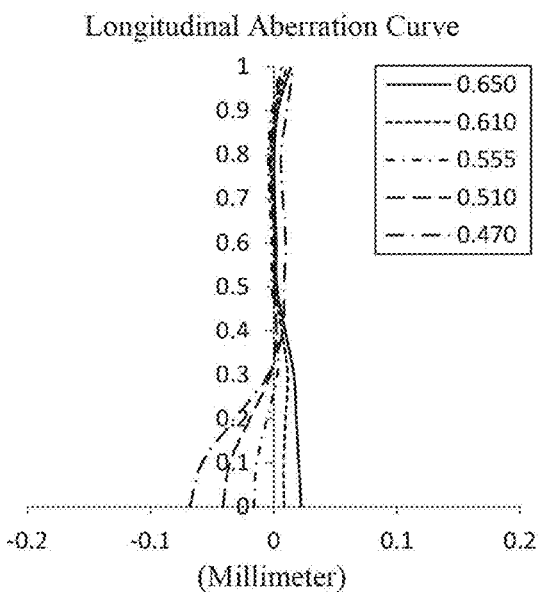
FIGS. 20A to 20D illustrate a longitudinal aberration curve, an astigmatic curve, a distortion curve, and a lateral color curve of the optical imaging lens assembly of the example 10, respectively.
Figure 20B:
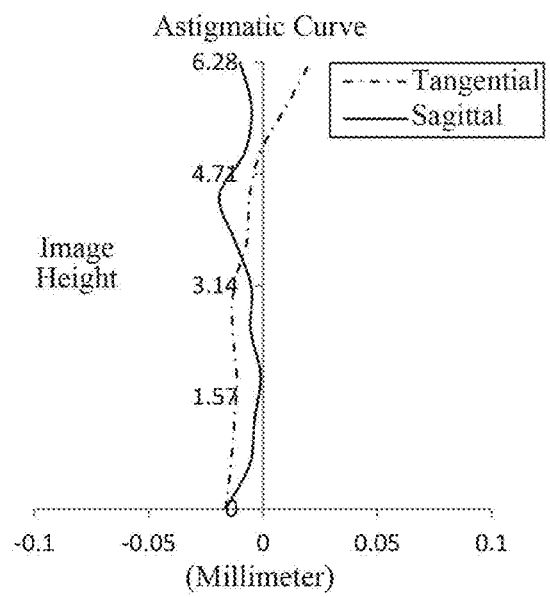
Figure 20C:
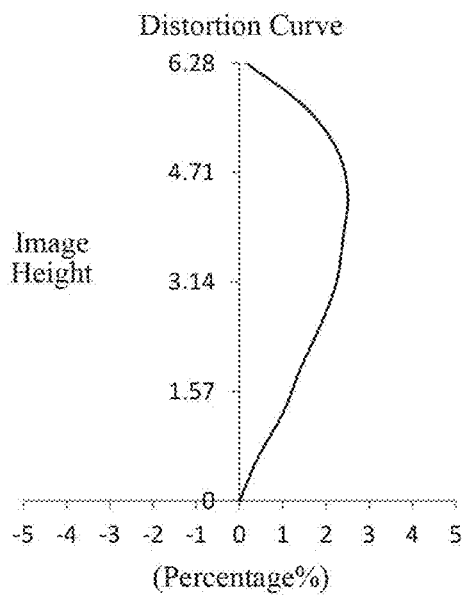
Figure 20D:
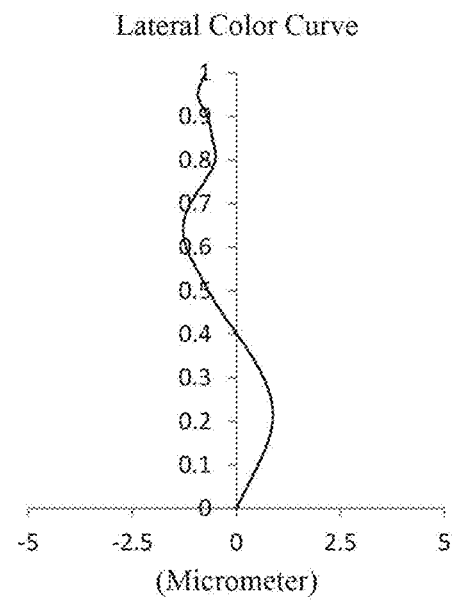

FIG. 20A illustrates a longitudinal aberration curve of the optical imaging lens assembly according to example 10, representing deviations of focal points converged by light of different wavelengths after passing through the lens assembly. FIG. 20B illustrates an astigmatic curve of the optical imaging lens assembly according to example 10, representing a curvature of a tangential plane and a curvature of a sagittal plane. FIG. 20C illustrates a distortion curve of the optical imaging lens assembly according to example 10, representing amounts of distortion corresponding to different image heights. FIG. 20D illustrates a lateral color curve of the optical imaging lens assembly according to example 10, representing deviations of different image heights on an imaging plane after light passes through the lens assembly.

It can be seen from FIG. 20A to FIG. 20D that the optical imaging lens assembly provided in example 10 may achieve good image quality.

In view of the above, examples 1 to 10 respectively satisfy the relationship shown in Table 21.

TABLE 21

| Conditional/Example | 1 | 2 | 3 | 4 | 5 | 6 | 7 | 8 | 9 | 10 |
|---|---|---|---|---|---|---|---|---|---|---|
| T34/(T45 + T67) | 1.12 | 1.14 | 1.04 | 1.14 | 1.05 | 1.07 | 0.80 | 2.53 | 2.63 | 1.54 |
| TTL/ImgH | 1.31 | 1.33 | 1.32 | 1.34 | 1.31 | 1.32 | 1.35 | 1.35 | 1.35 | 1.39 |
| f1/R1 | 2.43 | 2.42 | 2.43 | 2.40 | 2.46 | 2.19 | 2.11 | 2.23 | 2.23 | 3.59 |
| f5/R9 | 1.21 | 1.26 | 1.16 | 1.22 | 1.23 | 1.20 | 1.56 | 1.21 | 1.98 | 1.19 |
| R2/R5 | 1.01 | 0.95 | 1.01 | 1.06 | 0.98 | 2.04 | 2.22 | 1.87 | 2.32 | 2.10 |
| R3/R4 | 1.55 | 1.48 | 1.52 | 1.52 | 1.49 | 1.73 | 1.72 | 1.71 | 1.67 | 1.70 |
| CT7/T78 | 1.04 | 1.10 | 0.98 | 1.14 | 1.03 | 1.73 | 1.77 | 1.61 | 2.44 | 1.49 |
| CT6/T56 | 2.10 | 2.54 | 2.31 | 2.21 | 2.54 | 2.01 | 1.71 | 2.26 | 1.93 | 2.00 |
| CT1/CT3 | 1.81 | 1.72 | 1.80 | 1.78 | 1.76 | 2.65 | 3.60 | 2.51 | 2.03 | 3.33 |
| CT4/T34 | 1.86 | 1.81 | 1.83 | 1.79 | 1.86 | 1.02 | 1.49 | 1.18 | 1.58 | 1.19 |
| (CT8 + T67)/CT5 | 2.09 | 2.64 | 2.41 | 2.59 | 2.34 | 3.50 | 3.84 | 1.88 | 1.75 | 2.20 |
| R15/R3 | −1.36 | −1.59 | −1.49 | −1.49 | −1.52 | −2.96 | −3.46 | −3.02 | −4.30 | −3.52 |
| T78/T67 | 5.29 | 5.63 | 4.45 | 6.66 | 4.83 | 1.68 | 1.98 | 4.30 | 3.81 | 3.19 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, a sixth lens, a seventh lens and an eighth lens, which are sequentially arranged from an object side to an image side of the optical imaging lens assembly along an optical axis,
    wherein each of the first lens to the eighth lens has refractive power,
    wherein 1.5<CT6/T56<2.6,
    Fno≤1.7,
    where CT6 is a center thickness of the sixth lens along the optical axis, T56 is a spaced interval between the fifth lens and the sixth lens along the optical axis, and Fno is a relative F number of the optical imaging lens assembly; and
    1.31≤TTL/ImgH≤1.39,
    where TTL is a distance along the optical axis from an object-side surface of the first lens to an imaging plane of the optical imaging lens assembly,
    ImgH is half of a diagonal length of an effective pixel area on the imaging plane of the optical imaging lens assembly; and
    wherein 1.16≤f5/R9≤1.56,
    where f5 is an effective focal length of the fifth lens, and R9 is a radius of curvature of an object-side surface of the fifth lens.

2. The optical imaging lens assembly according to claim 1, wherein 2.0<f1/R1<3.6,
    where f1 is an effective focal length of the first lens, and R1 is a radius of curvature of an object-side surface of the first lens.

3. The optical imaging lens assembly according to claim 1, wherein 0.5<R2/R5<2.5,
    where R2 is a radius of curvature of an image-side surface of the first lens, and R5 is a radius of curvature of an object-side surface of the third lens.

4. The optical imaging lens assembly according to claim 1, wherein 1.0<R3/R4<2.0,
    where R3 is a radius of curvature of an object-side surface of the second lens, and R4 is a radius of curvature of an image-side surface of the second lens.

5. The optical imaging lens assembly according to claim 1, wherein 0.5<CT7/T78<2.5,
    where CT7 is a center thickness of the seventh lens along the optical axis, and T78 is a spaced interval between the seventh lens and the eighth lens along the optical axis.

6. The optical imaging lens assembly according to claim 1, wherein 1.5<CT1/CT3<4.0,
    where CT1 is a center thickness of the first lens along the optical axis, and CT3 is a center thickness of the third lens along the optical axis.

7. The optical imaging lens assembly according to claim 1, wherein a refractive index of the second lens and a refractive index of the fifth lens are both greater than 1.65.

8. The optical imaging lens assembly according to claim 1, wherein 1.0<CT4/T34<2.0,
    where CT4 is a center thickness of the fourth lens along the optical axis, and T34 is a spaced interval between the third lens and the fourth lens along the optical axis.

9. The optical imaging lens assembly according to claim 1, wherein 1.5<(CT8+T67)/CT5<4.0,
    where CT5 is a center thickness of the fifth lens along the optical axis, CT8 is a center thickness of the eighth lens along the optical axis, and T67 is a spaced interval between the sixth lens and the seventh lens along the optical axis.

10. The optical imaging lens assembly according to claim 1, wherein the fourth lens has positive refractive power, an object-side surface of the fourth lens is a concave surface, and an image-side surface of the fourth lens is a convex surface.

11. The optical imaging lens assembly according to claim 1, wherein an object-side surface of the fifth lens is a concave surface, and an image-side surface of the fifth lens is a concave surface.

12. The optical imaging lens assembly according to claim 1, wherein 0.8≤T34/(T45+T67)<3.0,
where T34 is a spaced interval between the third lens and the fourth lens along the optical axis, T45 is a spaced interval between the fourth lens and the fifth lens along the optical axis, and T67 is a spaced interval between the sixth lens and the seventh lens along the optical axis.

13. The optical imaging lens assembly according to claim 1, wherein −4.5<R15/R3<−1.0,
where R3 is a radius of curvature of an object-side surface of the second lens, and R15 is a radius of curvature of an object-side surface of the eighth lens.

14. The optical imaging lens assembly according to claim 1, wherein 1.5<T78/T67<7.0,
where T67 is a spaced interval between the sixth lens and the seventh lens along the optical axis, and T78 is a spaced interval between the seventh lens and the eighth lens along the optical axis.

15. The optical imaging lens assembly according to claim 1,
wherein 0.8≤T34/(T45+T67)<3.0, and
where T34 is a spaced interval between the third lens and the fourth lens along the optical axis, T45 is a spaced interval between the fourth lens and the fifth lens along the optical axis, and T67 is a spaced interval between the sixth lens and the seventh lens along the optical axis.

16. The optical imaging lens assembly according to claim 15, wherein 2.0<f1/R1<3.6,
where f1 is an effective focal length of the first lens, and R1 is a radius of curvature of an object-side surface of the first lens.

17. The optical imaging lens assembly according to claim 15, wherein 1.0<f5/R9<2.0,
where f5 is an effective focal length of the fifth lens, and R9 is a radius of curvature of an object-side surface of the fifth lens.

18. The optical imaging lens assembly according to claim 15, wherein 1.5<(CT8+T67)/CT5<4.0,
where CT5 is a center thickness of the fifth lens along the optical axis, CT8 is a center thickness of the eighth lens along the optical axis, and T67 is the spaced interval between the sixth lens and the seventh lens along the optical axis.

* * * * *